United States Patent [19]

Voglrieder et al.

[11] 4,173,817
[45] Nov. 13, 1979

[54] MACHINING CENTER WITH AUTOMATIC TOOL CHANGER

[75] Inventors: Leonhard Voglrieder, Howell; Raymond O. Hempel, Jr., LaSalle, both of Mich.

[73] Assignee: Ex-Cell-O Corporation, Troy, Mich.

[21] Appl. No.: 885,045

[22] Filed: Mar. 9, 1978

Related U.S. Application Data

[62] Division of Ser. No. 790,224, Apr. 25, 1977, Pat. No. 4,102,035.

[51] Int. Cl.$^2$ .......................... B23Q 3/157; B23Q 1/06
[52] U.S. Cl. ...................................... 29/568; 409/225; 414/714
[58] Field of Search ................ 29/568, 563; 90/11 R, 90/13 C, 58 B; 214/1 BB, 1 BC; 408/71

[56] References Cited

U.S. PATENT DOCUMENTS

| | | | |
|---|---|---|---|
| 3,825,245 | 7/1974 | Osburn et al. | 214/1 BC |
| 3,986,617 | 10/1976 | Blomquist | 214/1 BB |
| 4,090,287 | 5/1978 | Selander | 214/1 BB |

*Primary Examiner*—Gil Weidenfeld
*Attorney, Agent, or Firm*—James H. Bower; Mitchell J. Hill

[57] ABSTRACT

A machining center type machine tool which is a four-axis, horizontal spindle machining center with a carousel-type automatic tool changer and which is adapted to be controlled by a computer numerical control system. The machining center can perform a variety of machining operations, such as milling, contouring, drilling, tapping and boring, in both roughing and finishing applications. A rotary work table is operatively carried on two movable, perpendicularly disposed slide members to provide movement of the work table along both "X" and "Z" axes. A horizontal tool spindle slide assembly is slidably mounted on a "Y" axis on a twin column assembly. A rotary, carousel-type combination tool storage and tool changer, holding twenty-four tools, is rotatably mounted on a horizontal axis that is aligned and parallel with the axis of the horizontal tool spindle. The rotary carousel functions to automatically load and unload tools directly into the tool spindle at a tool exchange location. The tool spindle extracts the tools from the carousel, and inserts the tools back into the carousel after a cutting operation. The machining center includes a manually operated optional pallet changer for automatically loading a pallet carrying a new workpiece onto the work table, and unloading the pallet with a finished workpiece from the work table. The tool spindle is provided with automatic mechanical spindle positioning for each spindle stop.

7 Claims, 50 Drawing Figures

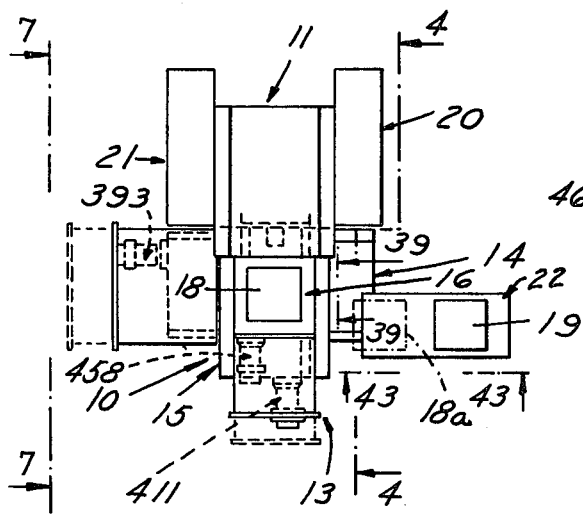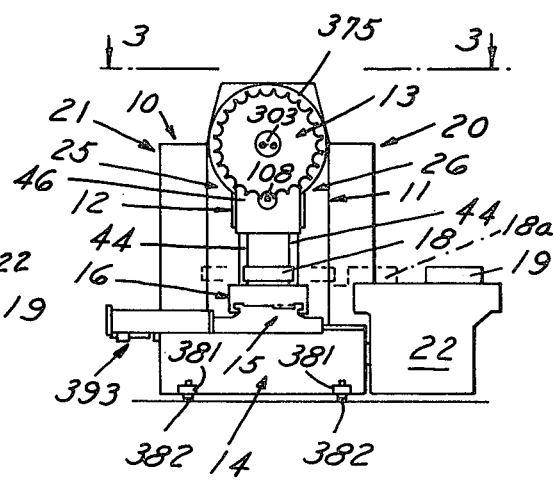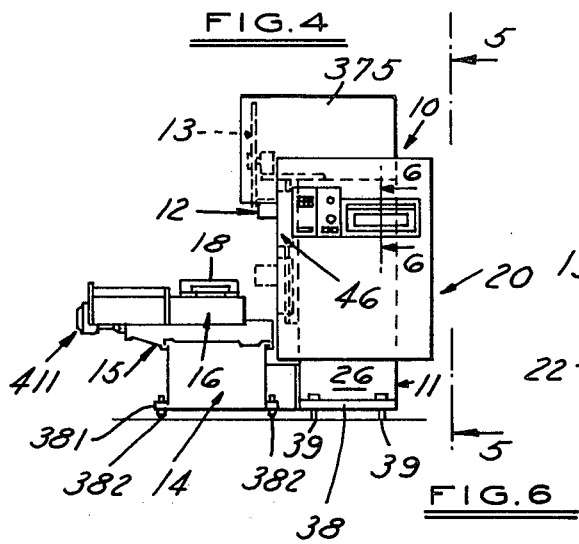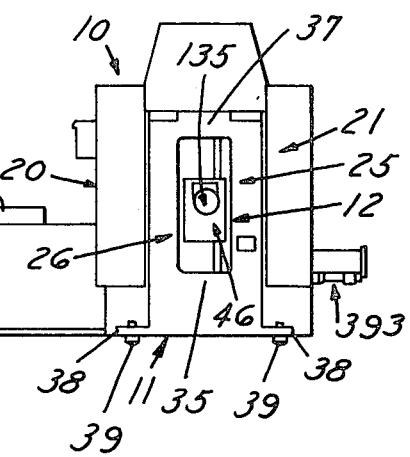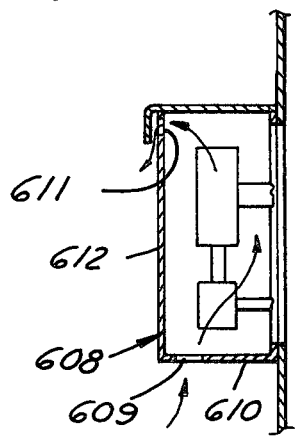

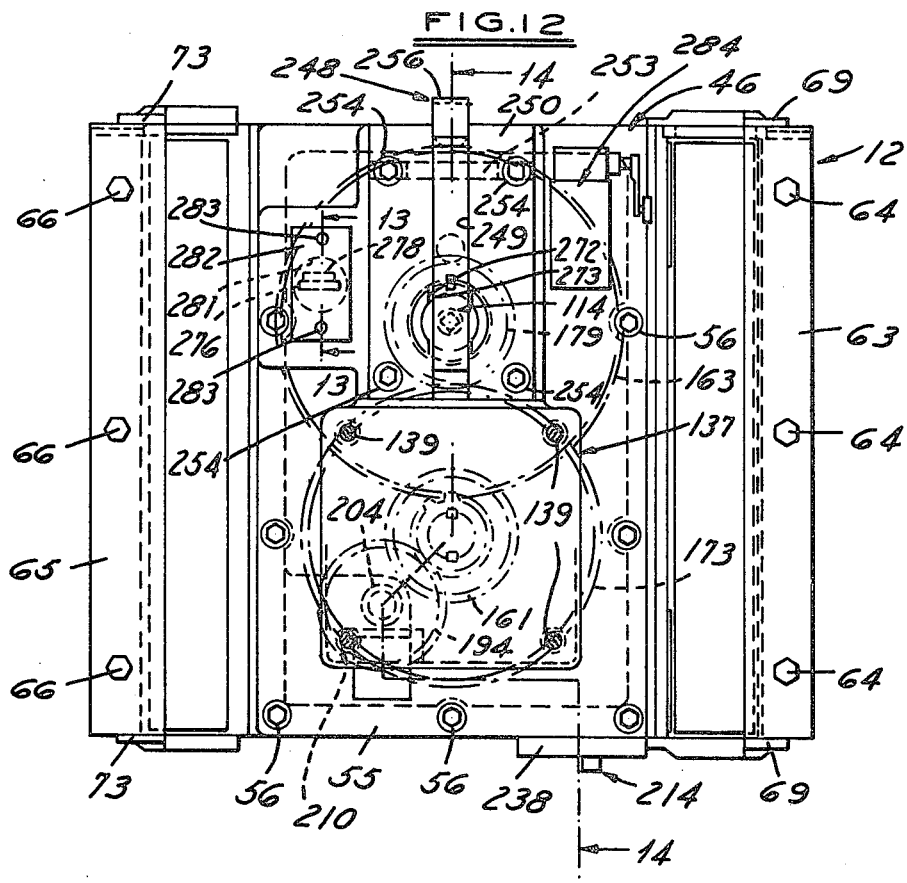
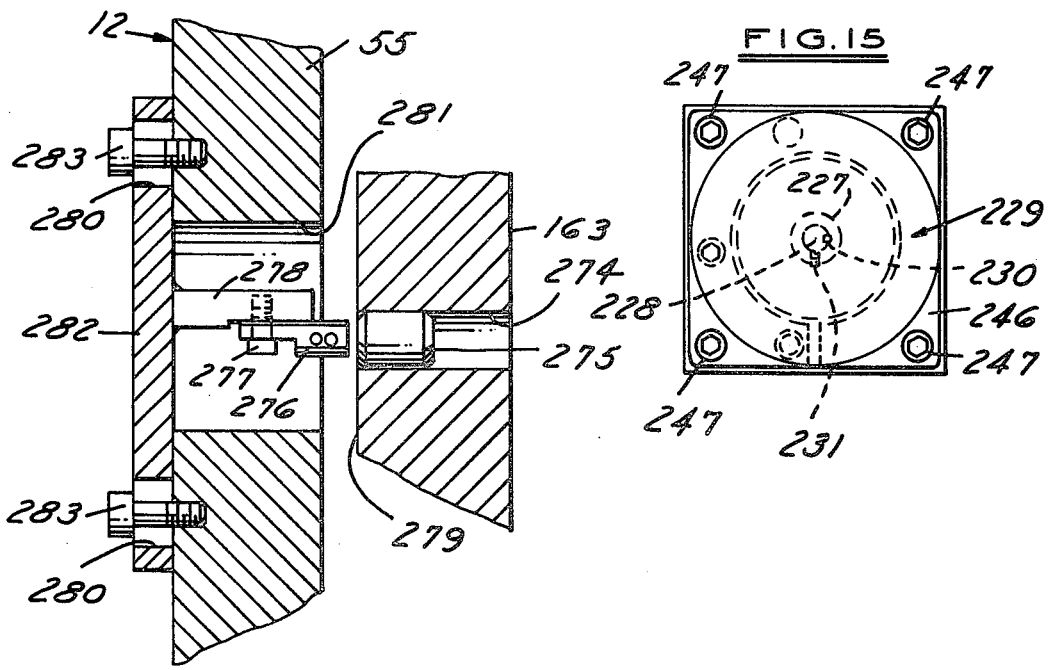

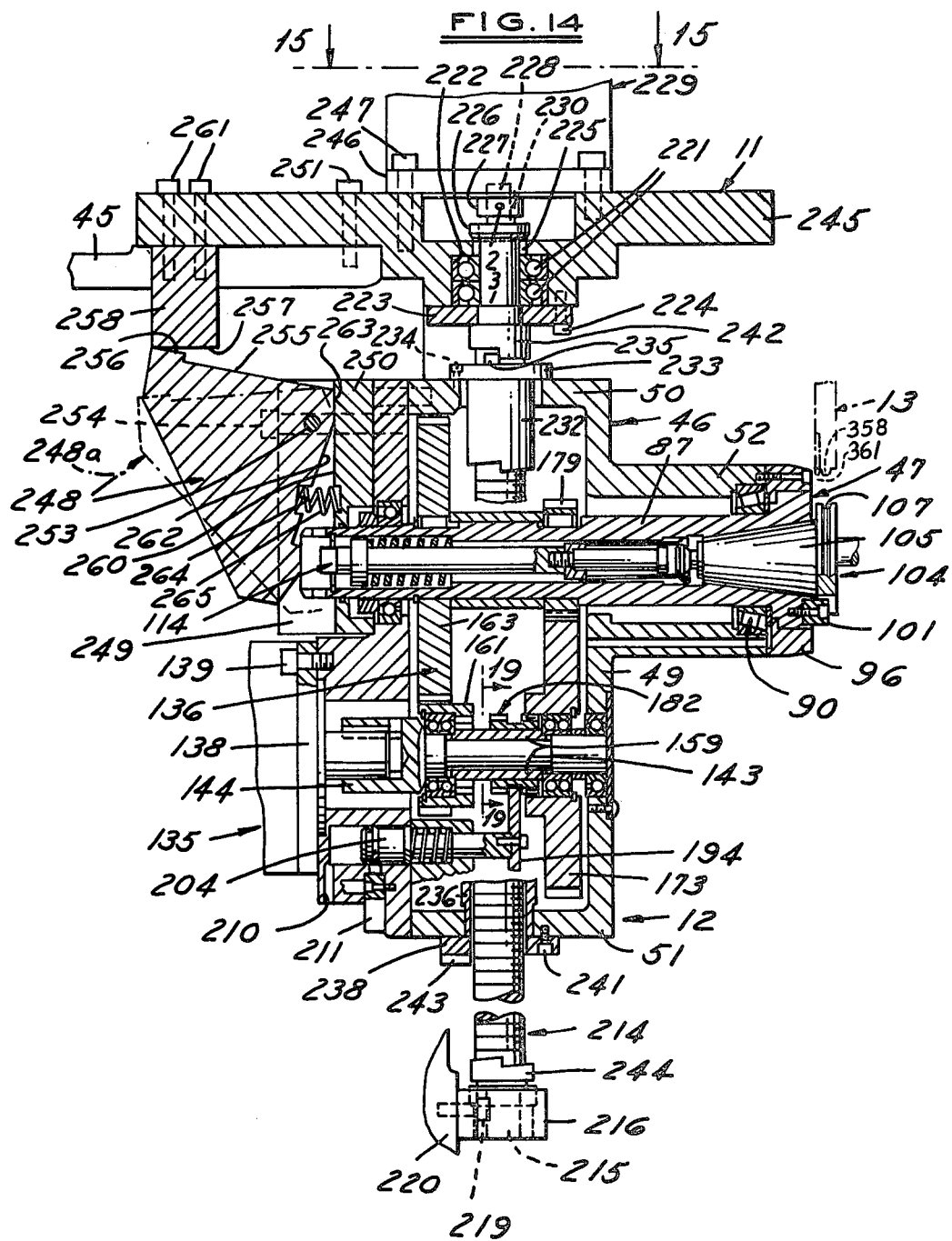

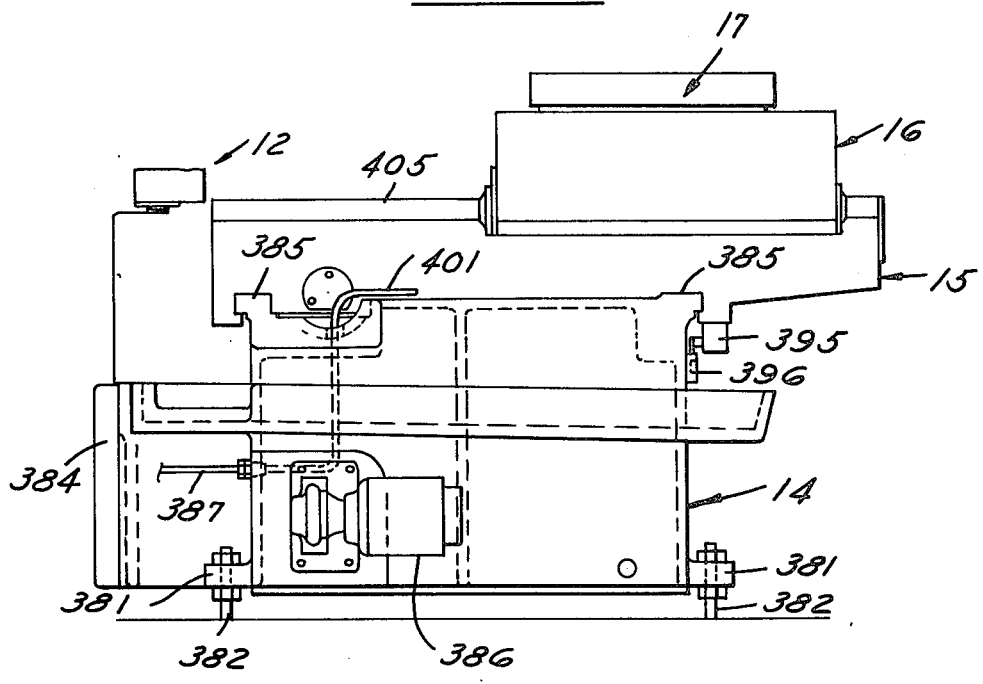
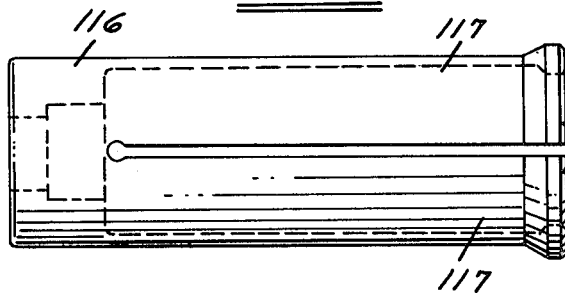
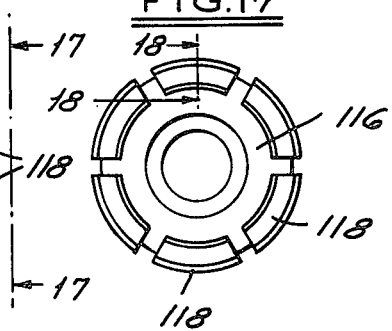
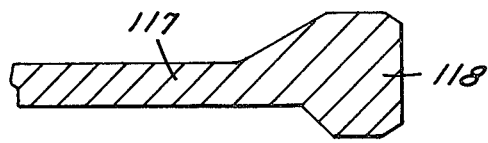

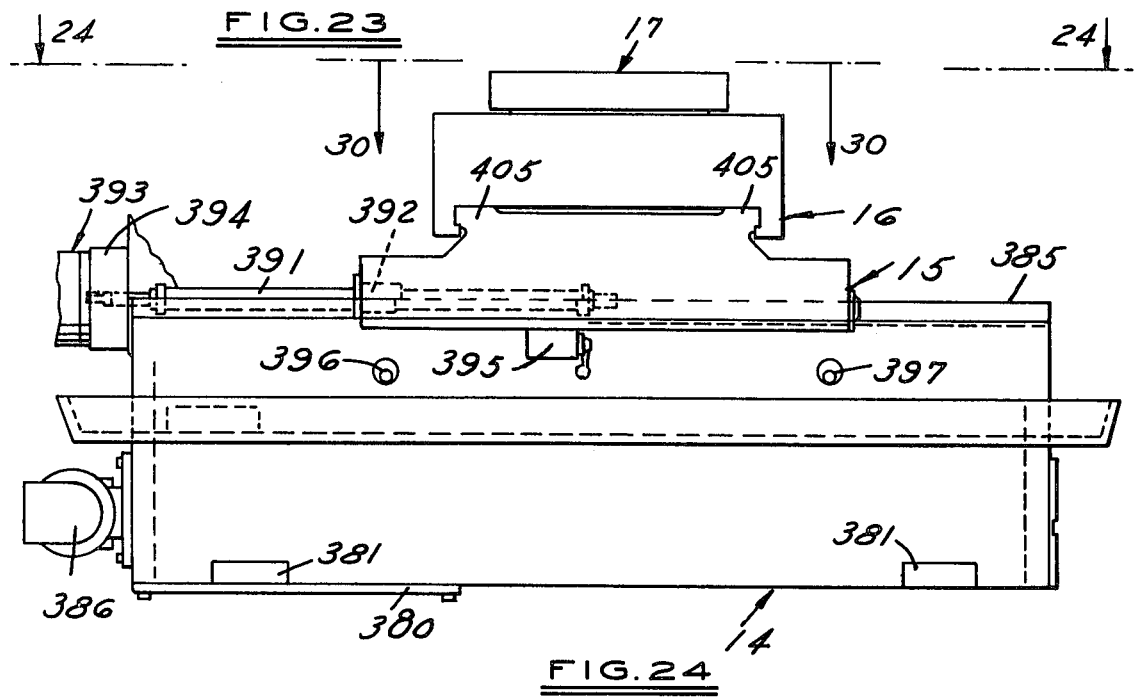
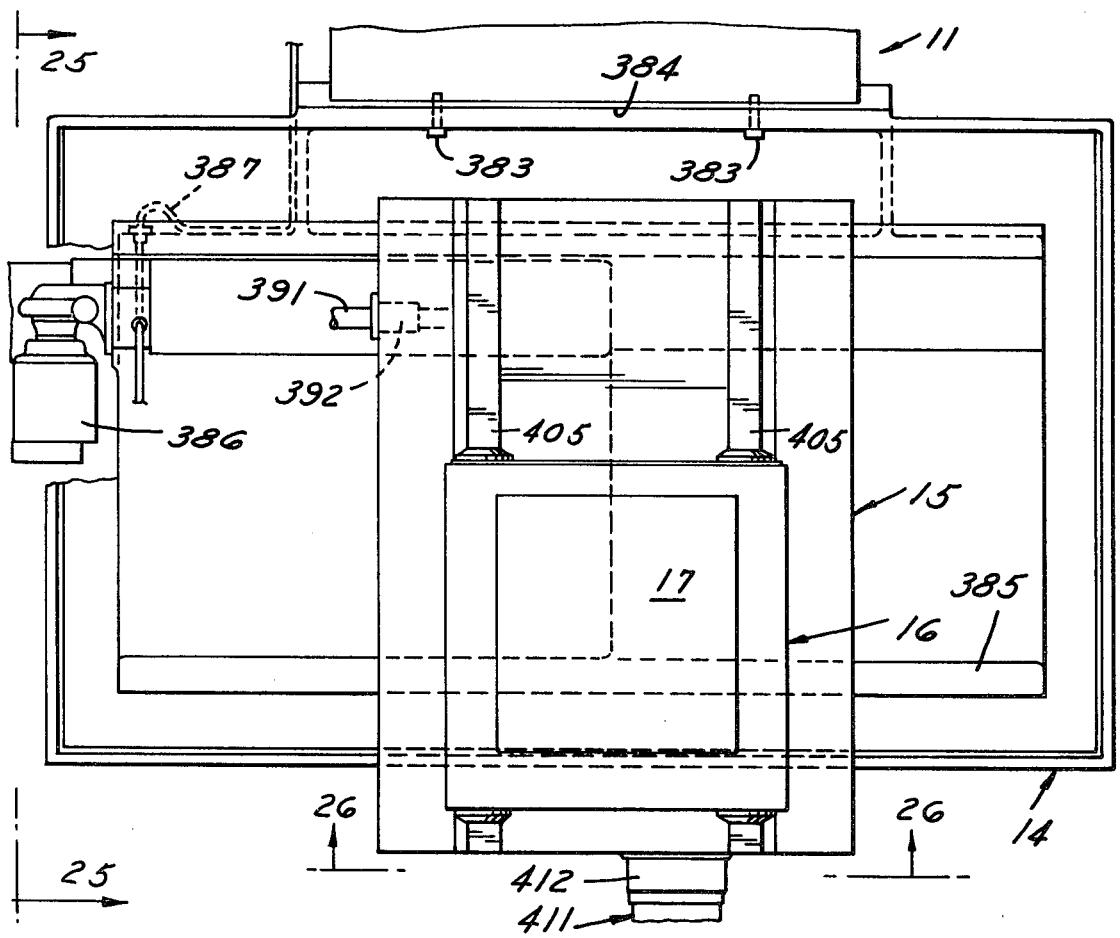

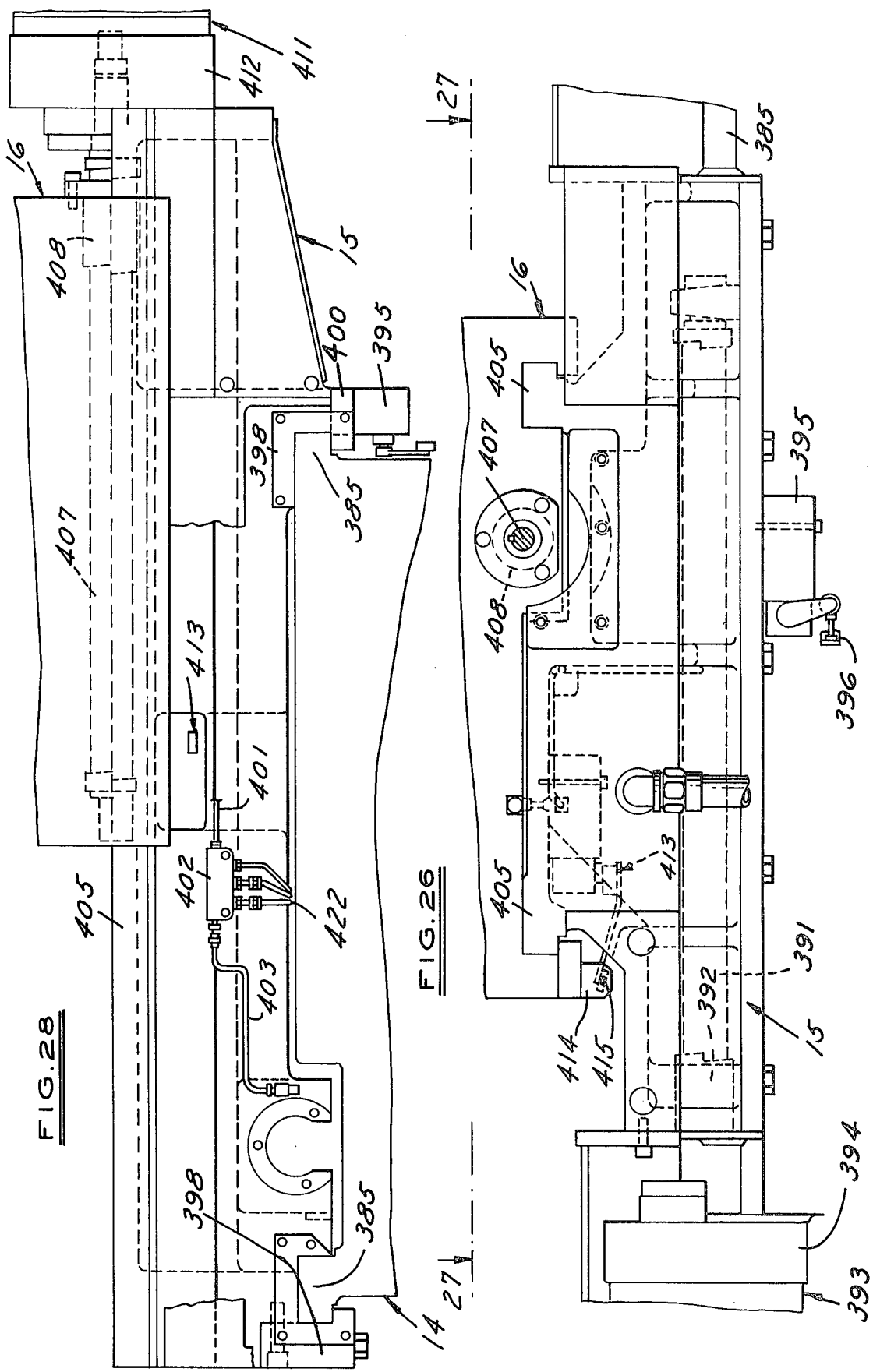

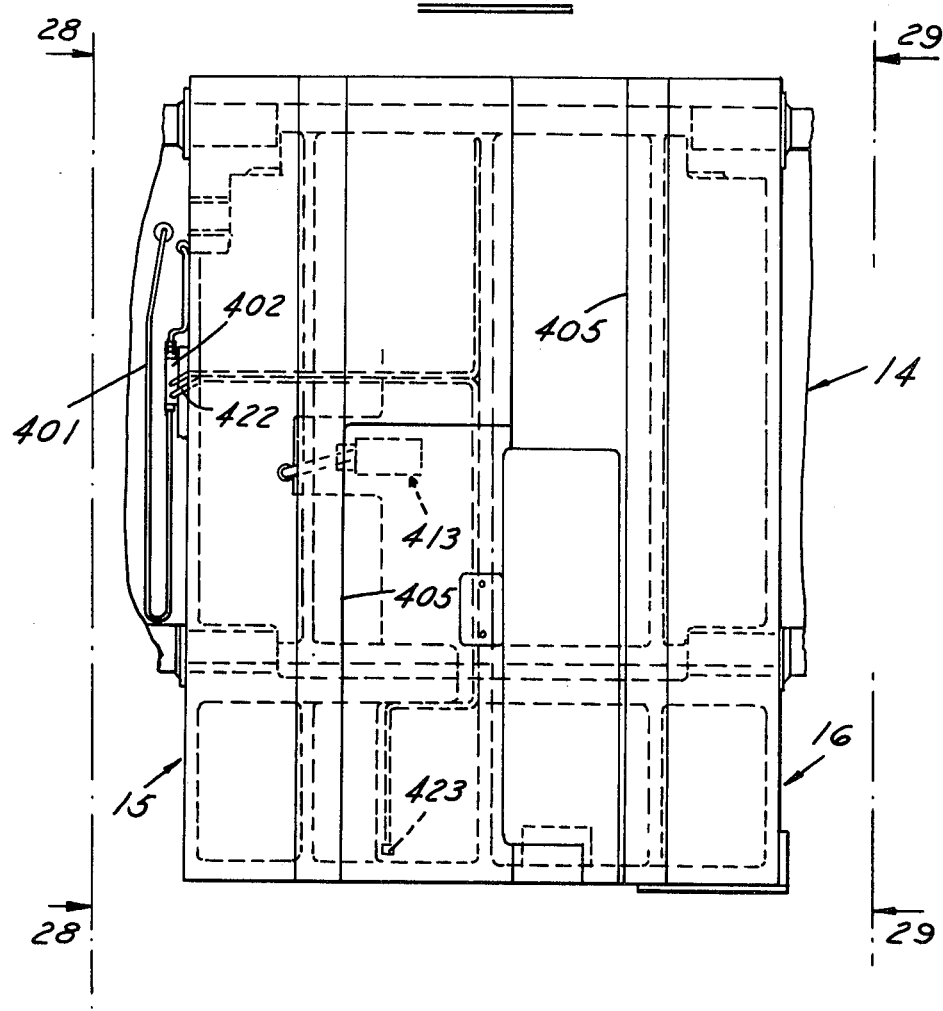
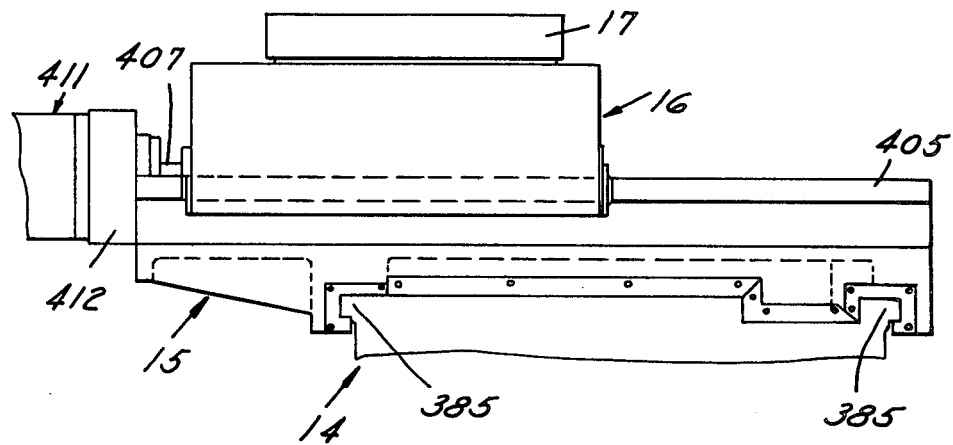

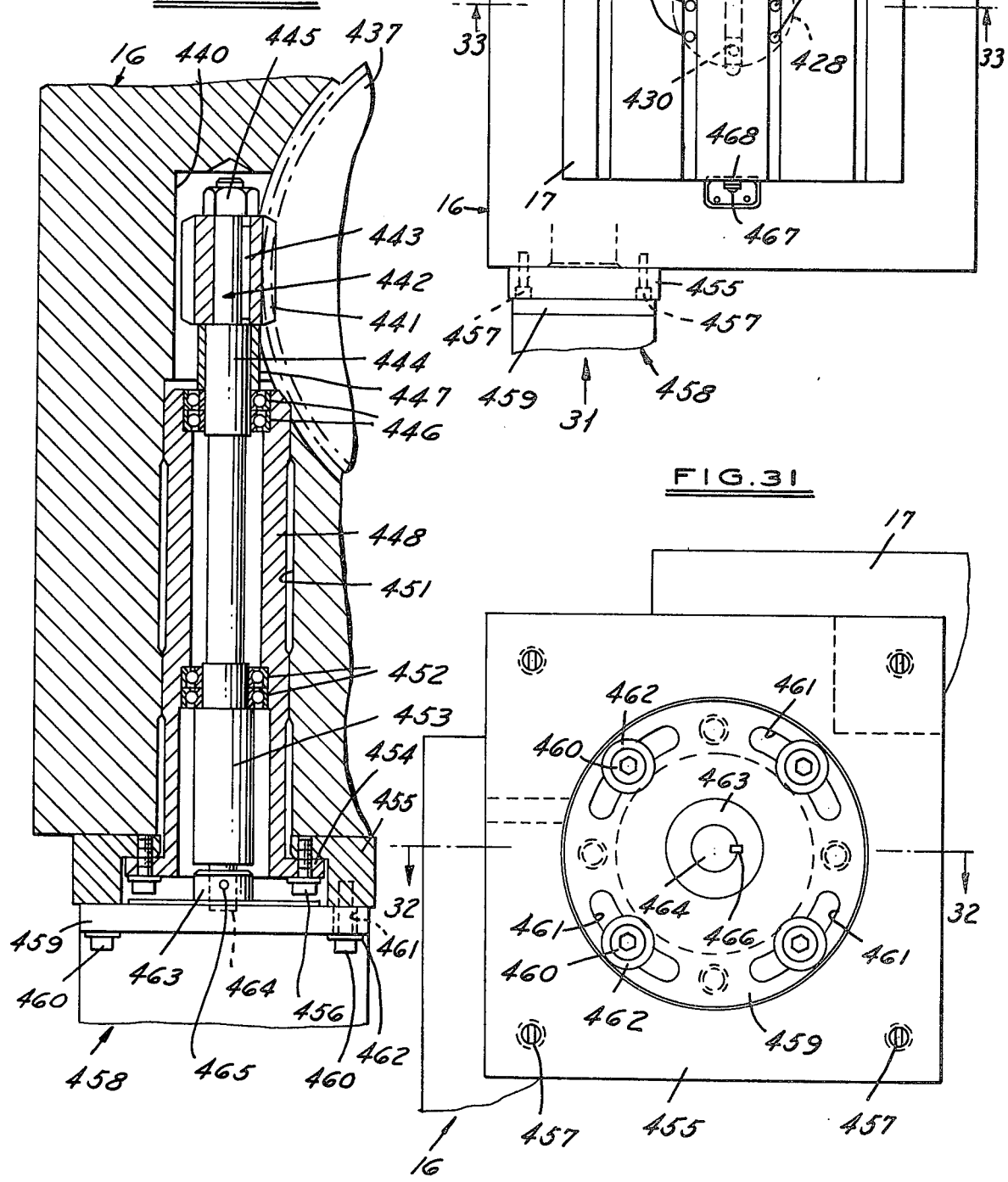

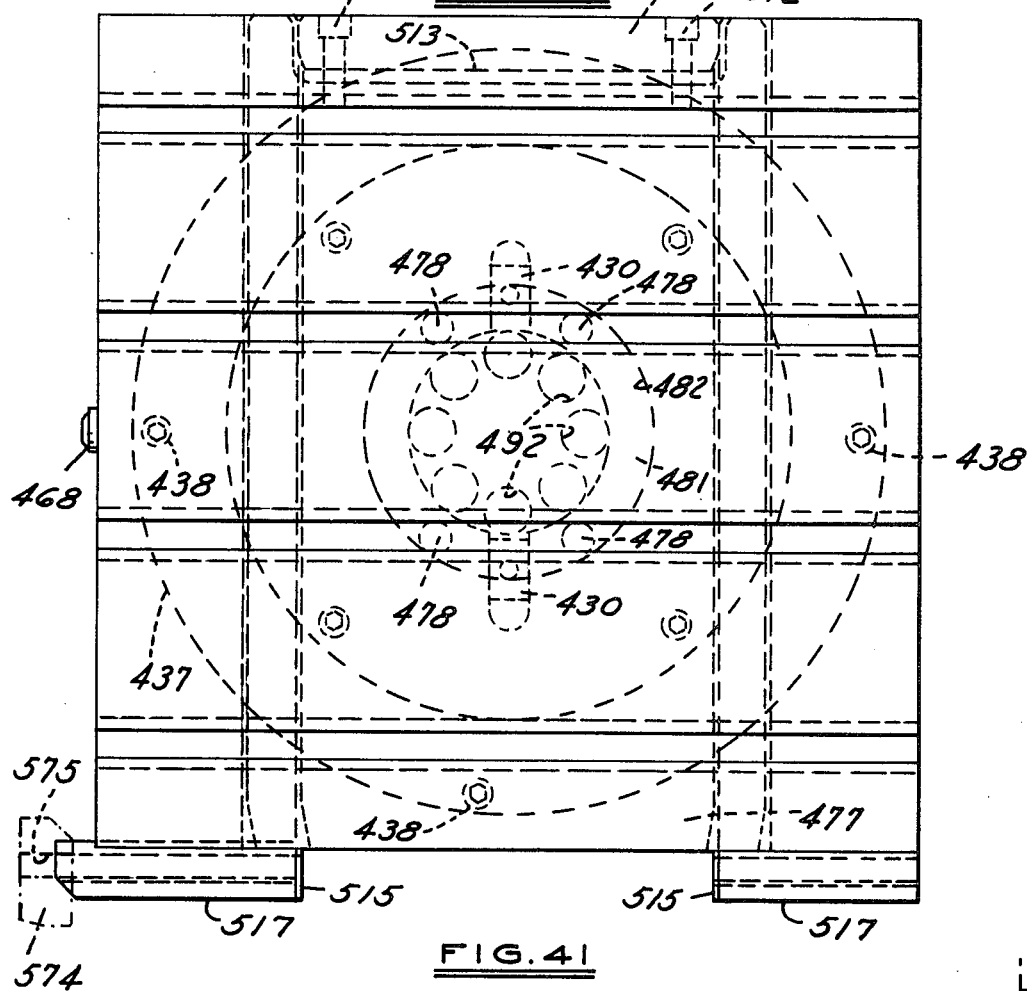
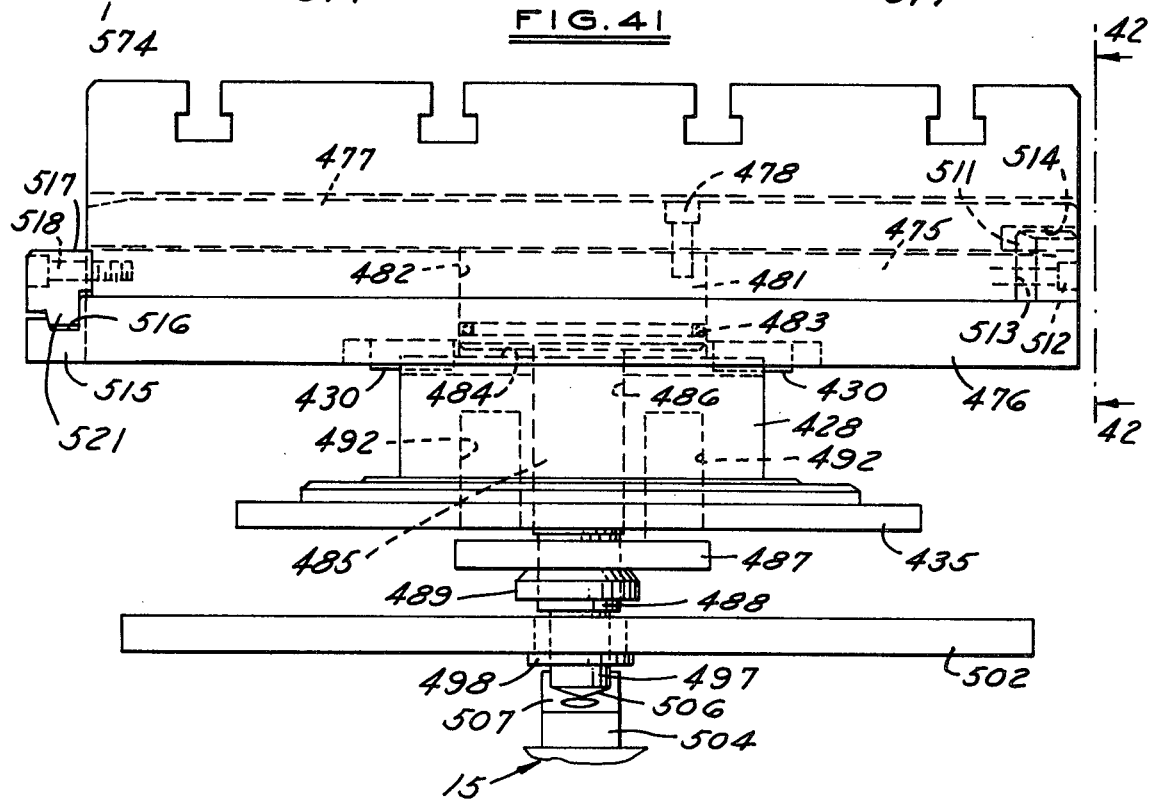

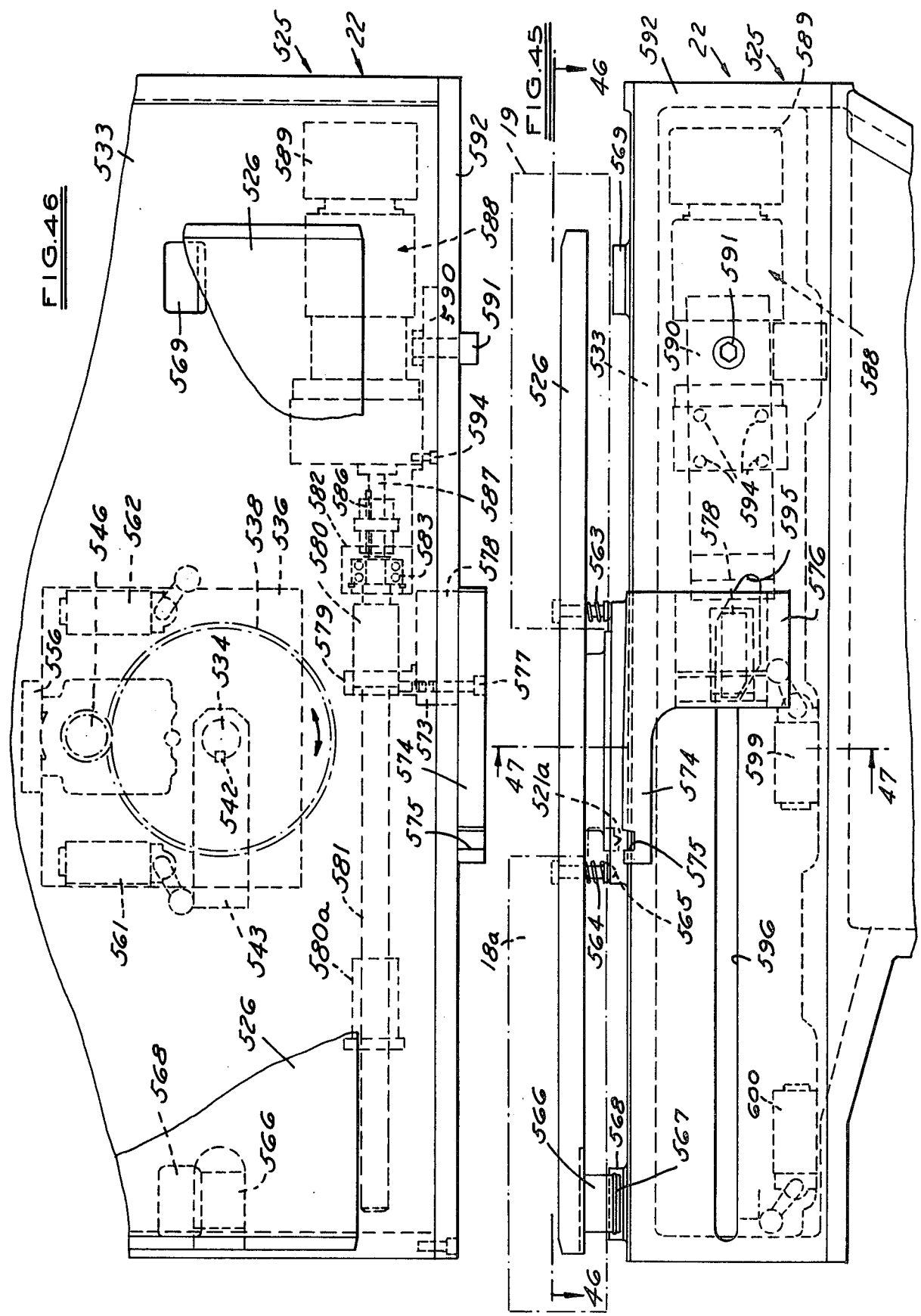

MACHINING CENTER WITH AUTOMATIC TOOL CHANGER

This is a division, of application Ser. No. 790,224, filed Apr. 25, 1977 now U.S. Pat. No. 4,102,035 issued July 25, 1978.

BACKGROUND OF THE INVENTION

1. Field of the Invention

This invention relates to machining center type machine tools, and more particularly to four-axis, horizontal spindle machining centers capable of performing various machining operations including milling, contouring, boring, drilling and tapping, in both roughing and precision finishing applications, and which are provided with automatic tool changer means and controlled by numerical control means.

2. Description of the Prior Art

It is known in the machine tool art to provide machining center type machine tools having rotatable machine tool spindles that are capable of being stopped at a predetermined angular position, and which are provided with automatic tool changer means for transferring tools in a predetermined sequence directly between a tool storage means and the tool spindle, to provide the tool spindle with a predetermined sequence of tools, for carrying out a desired sequence of operations. A disadvantage of the prior art machining centers is that one or more tool changer means must be employed for transferring tools between the tool storage means and the tool spindle, which action increases the tool transfer time. Another disadvantage of the prior art machining centers is that the tool storage means is disposed in a position whereby the operator does not have full visibility of the tools when they are in the storage means, and the storage means is not accessible to the operator for manual changing of the tools between tool change cycles while the machining center is running. A further disadvantage of the prior art machining centers is that they are complex, and constructed and arranged whereby heat from the lube oil and heat generated by the running of the machine is retained in the machine structure, which adversely affects the accuracy of the machining operations carried out by the machining center. The prior art machining centers employ the use of hydraulic cylinders for tool changing and other machine functions which produce adverse heat and noise.

SUMMARY OF THE INVENTION

In accordance with the present invention, the illustrative embodiment of the invention comprises a horizontal spindle, four-axis machining center which is capable of performing a variety of machining operations including milling, contouring, boring, drilling and tapping, in both roughing and precision finishing applications, and adapted to be controlled by a computer numerical control means. The automatic tool changer means also functions as a tool storage means, and it comprises a bi-directional, randomselect tool carousel which is rotatably mounted on a horizontal axis above the horizontal tool spindle to permit the rotatable carousel to directly load and unload a selected sequence of tools into and out of the tool spindle. The tool spindle and the combination tool storage and tool changer carousel function together to effect tool transfer operations without the need for any intermediate tool changer means. The tool spindle functions to withdraw a selected tool for a cutting operation from the tool carousel and to replace the tool after the cutting operation back into its previous position in the tool carousel. The tool carousel inserts a selected tool into the tool spindle for a cutting operation and removes the tool from the tool spindle after the cutting operation. The tool spindle is automatically positioned in a predetermined angular position at each spindle stop by a mechanical means which also releases the tool carried in the spindle. Up to twenty-four tools can be stored in the rotary, high speed carousel tool changer which changes tools in four seconds. The tool carousel is provided with an up-and-down counter for controlling the operation of the carousel to stop the carousel with the required tool in the tool exchange location.

The machining center includes a work table which is rotatably mounted about a vertical axis on a work table slide assembly which is adapted to be moved on a saddle slide assembly toward and away from the tool spindle, as viewed from the front of the machine, along the "Z" or transverse axis. The tool spindle is movable upwardly and downwardly on a twin column assembly on the "Y" or vertical axis. The saddle slide assembly is slidably mounted on an "X" axis base for movement left or right, as viewed from the front of the machining center, along the "X" or longitudinal axis.

All of the machine functions are electro-mechanical. High response direct current servo motors are employed for driving preloaded precision ball screws for moving the "X", "Y" and "Z" axes slides and for rotating the rotary work table, and for driving the tool spindle through a two-speed gear transmission. All hydraulic equipment normally associated with multi-access machines has been eliminated, and only one small pneumatic cylinder is employed, whereby the machining center operates at a low noise level heretofore not achievable by the aforecited prior art machining centers. The machining center employs various mechanical apparatuses which are designed so that the action of one member causes a definite positive action of another, whereby almost all sequencing, orienting and positioning is positive, sure and safe.

The machining center of the present invention includes an optional pallet changer to maximize machine utilization. While one part is being machined, another part can be loaded on the pallet changer. When machining of the first part is complete, manual activation of the short pallet change cycle places the second part into a work station on the machine. The pallet changer includes a rotary design which reduces floor space requirements, and keeps the loading operation close to the operator's normal work station at all times.

Other objects, features and advantages of this invention will be apparent from the following detailed description, appended claims, and the accompanying drawings.

BRIEF DESCRIPTION OF THE DRAWINGS

FIG. 2 is a reduced, front elevation view of the machining center illustrated in FIG. 1.

FIG. 3 is a top plan view of the machining center illustrated in FIG. 2, taken along the line 3—3 thereof, and looking in the direction of the arrows.

FIG. 4 is a right side, elevation view of the machining center illustrated in FIG. 3, taken along the line 4—4 thereof, and looking in the direction of the arrows.

FIG. 5 is a rear elevation view of the machining center illustrated in FIG. 4, taken along the line 5—5 thereof, and looking in the direction of the arrows.

FIG. 6 is a fragmentary, enlarged elevation section view of the machining center structure illustrated in FIG. 4, taken along the line 6—6 thereof, and looking in the direction of the arrows.

FIG. 12 is a rear elevation view of the spindle assembly employed in the machining center shown in FIG. 11, taken along the line 12—12 thereof, and looking in the direction of the arrows.

FIG. 13 is a fragmentary, enlarged elevation section view of the spindle assembly structure illustrated in FIG. 12, taken along the line 13—13 thereof, and looking in the direction of the arrows.

FIG. 14 is a fragmentary, enlarged elevation section view of the spindle assembly illustrated in FIG. 12, taken along the line 14—14 thereof, and looking in the direction of the arrows.

FIG. 15 is a fragmentary, elevation view of the spindle assembly structure illustrated in FIG. 14, taken along the line 15—15 thereof, and looking in the direction of the arrows.

FIG. 16 is a side elevation view of the collet employed in the spindle assembly shown in FIG. 14A.

FIG. 17 is a right side elevation view of the collet illustrated in FIG. 16, taken along the line 17—17 thereof, and looking in the direction of the arrows.

FIG. 18 is a fragmentary, enlarged elevation section view of the collet illustrated in FIG. 17, taken along the line 18—18 thereof, and looking in the direction of the arrows.

FIG. 23 is an enlarged, front elevation view of the base, saddle and table assembly, as seen in FIG. 2, but without the optional pallet changer.

FIG. 24 is a top plan view of the machining center structure shown in FIG. 23, taken along the line 24—24 thereof, and looking in the direction of the arrows.

FIG. 25 is a left side view of the machining center structure illustrated in FIG. 24, taken along the line 25—25 thereof, and looking in the direction of the arrows.

FIG. 26 is a fragmentary, enlarged, front elevation view of the saddle slide assembly illustrated in FIG. 24, taken along the line 26—26 thereof, and looking in the direction of the arrows.

FIG. 27 is a top plan view of the saddle slide assembly illustrated in FIG. 26, taken along the line 27—27 thereof, and with the table structure removed.

FIG. 28 is a left side elevation view of the saddle slide assembly illustrated in FIG. 27, taken along the line 28—28 thereof, and looking in the direction of the arrows.

FIG. 29 is a right side elevation view of the saddle slide assembly illustrated in FIG. 27, taken along the line 29—29 thereof, and looking in the direction of the arrows.

FIG. 30 is an enlarged, top view of the work table assembly illustrated in FIG. 23, taken along the line 30—30 thereof, and looking in the direction of the arrows.

FIG. 31 is an enlarged, elevation view of the work table structure illustrated in FIG. 30, taken in the direction of the arrow marked "31" and with the table drive motor removed.

FIG. 32 is an enlarged, fragmentary, horizontal section view of the work table structure illustrated in FIG. 31, taken along the line 32—32 thereof, and looking in the direction of the arrows.

FIG. 40 is a top plan view of the machining center structure illustrated in FIG. 39, taken along the line 40—40 thereof, and looking in the direction of the arrows.

FIG. 41 is a right side elevation view of the machining center structure illustrated in FIG. 39, taken along the line 41—41 thereof, and looking in the direction of the arrows.

FIG. 45 is a fragmentary, enlarged, right side elevation view of the pallet changer assembly structure illustrated in FIG. 44, taken along the line 45—45 thereof, and looking in the direction of the arrows.

FIG. 46 is a fragmentary, top view, with parts broken away, of the pallet changer assembly structure illustrated in FIG. 45, taken along the line 46—46 thereof, and looking in the direction of the arrows.

DESCRIPTION OF THE PREFERRED EMBODIMENT

General Description

Figure 1:
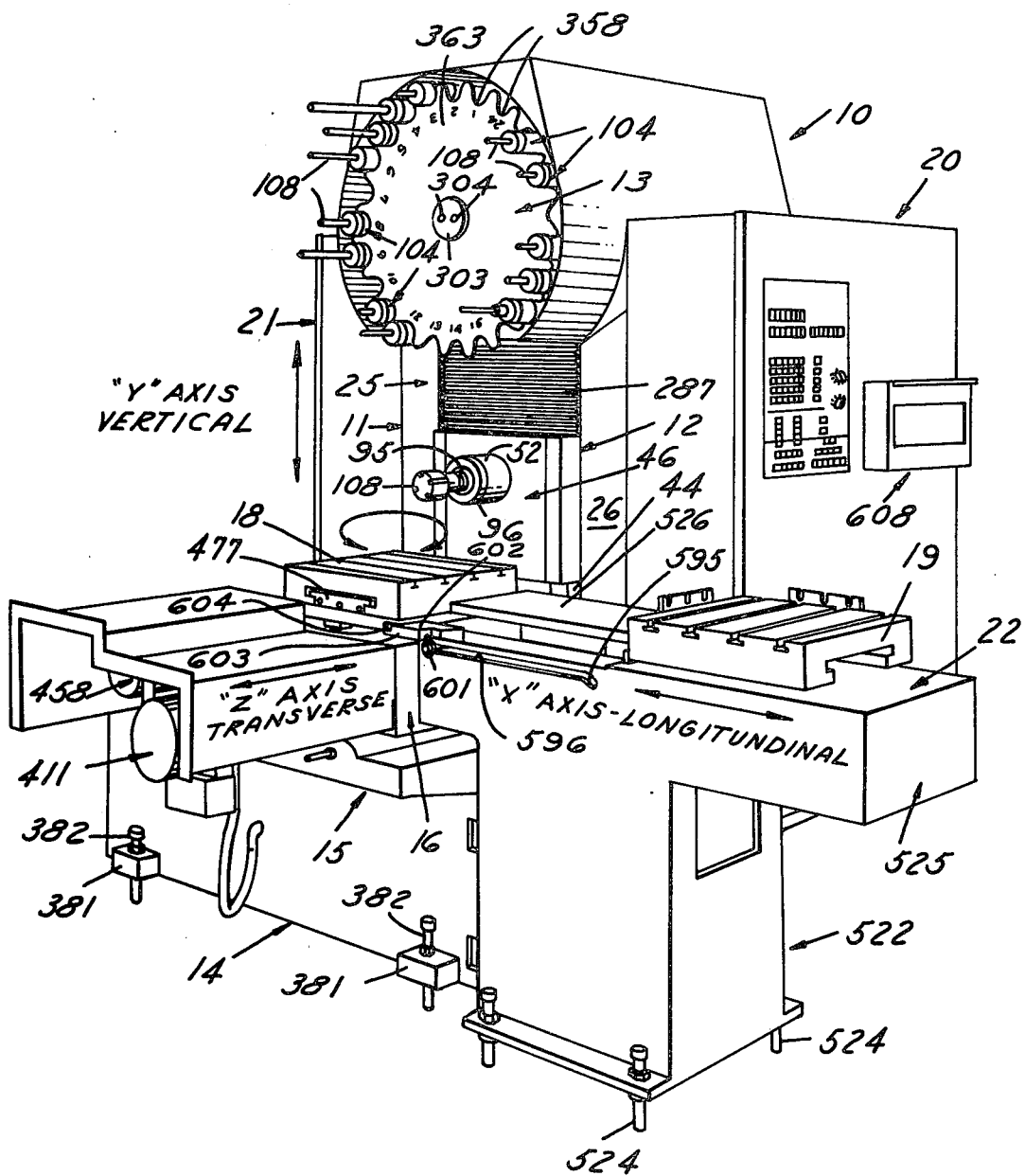
FIG. 1 is a front elevation perspective view of a machining center with an automatic tool changer made in accordance with the principles of the present invention, and provided with an optional pallet changer.

Referring now to the drawings, and in particular to FIG. 1, the numeral 10 generally designates an illustrative embodiment of the invention, which comprises a horizontal spindle, four-axis machining center that is capable of performing a variety of machining operations, including milling, contouring, boring, drilling and tapping, in both roughing and precision finishing applications. The machining center 10 includes a twin column assembly generally indicated by the numeral 11, on which is slidably mounted a tool spindle slide assembly, generally indicated by the numeral 12, which is mounted for vertical movement along the "Y" axis. The numeral 13 generally designates a rotatable tool storage carousel means which is operatively mounted on the top of the twin column assembly 11 for rotation about a horizontal axis that is in vertical alignment with the rotary axis of the tool spindle carried by the tool spindle slide assembly 12, as more fully described hereinafter.

A base member, generally indicated by the numeral 14, is operatively mounted in front of the twin column assembly 11. The base 14 has provided on the upper side thereof an "X" axis or longitudinal axis structure on which is slidably mounted a saddle slide assembly, generally indicated by the numeral 15. The numeral 16 generally designates a work table assembly which is operatively supported on the saddle slide assembly 15 for movement along the "Z" axis or transverse axis.

Figure 33:
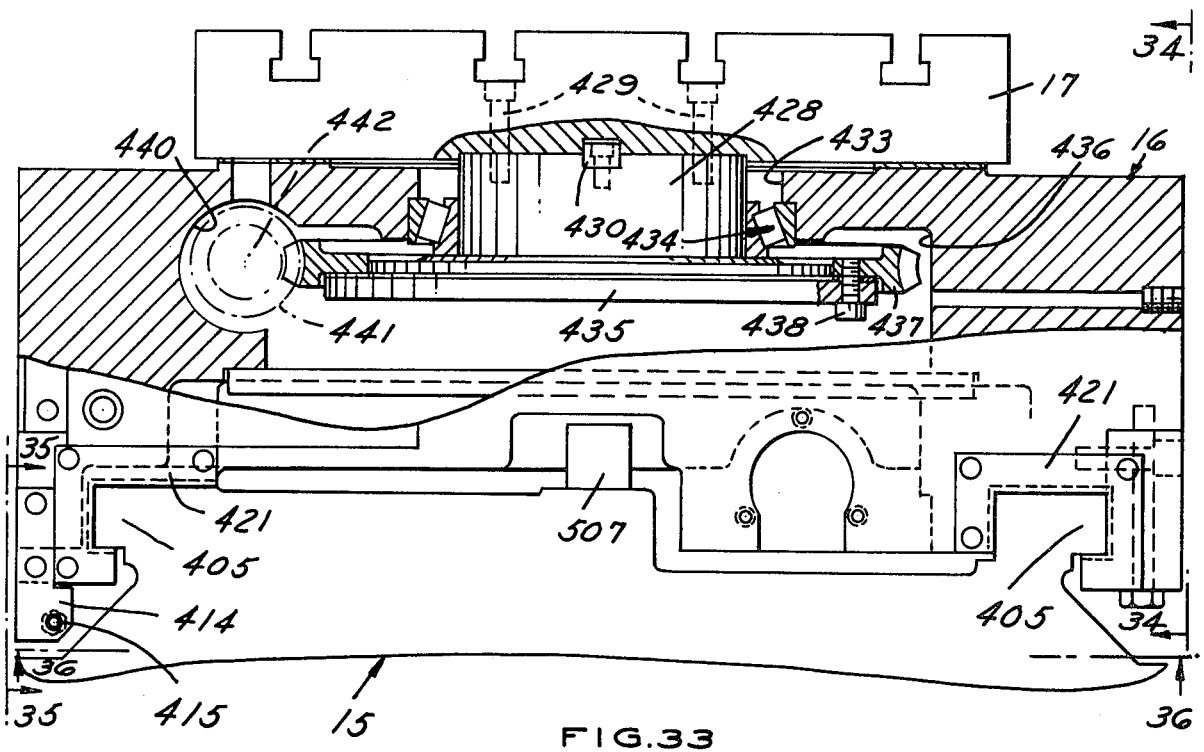
FIG. 33 is an enlarged, front elevation view of the work table structure illustrated in FIG. 30, shown partly in front elevation, and partly in section taken along the line 33—33 of FIG. 30 and looking in the direction of the arrows.
Figure 34:
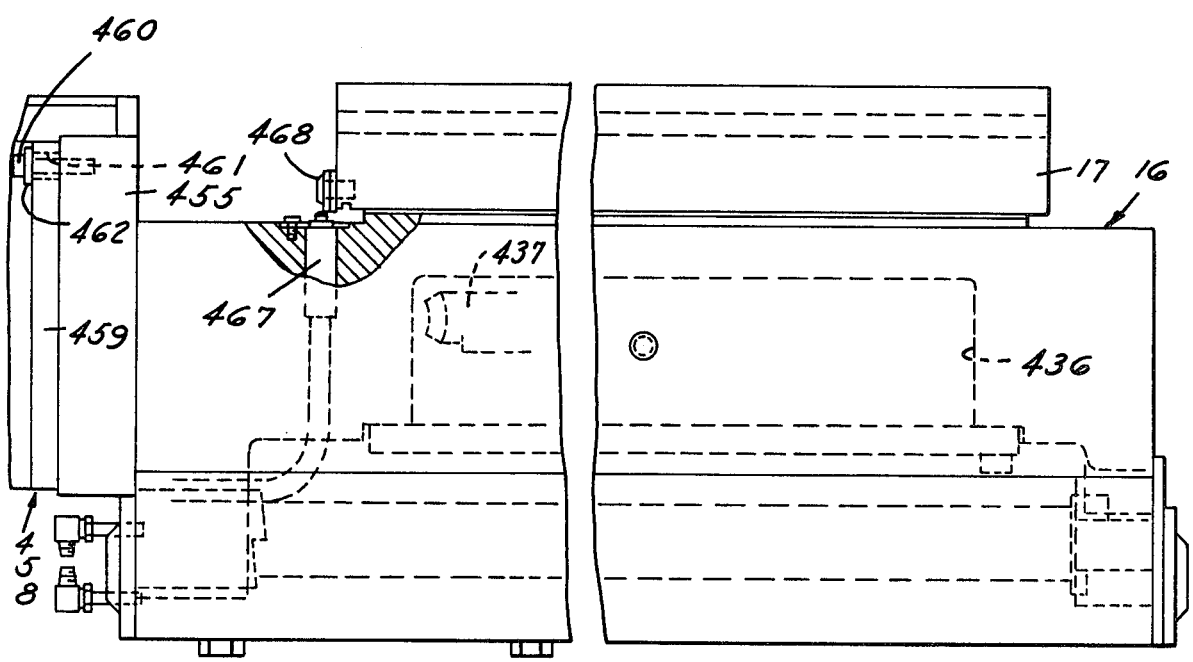
FIG. 34 is a right side elevation view of the work table structure illustrated in FIG. 33, taken along the line 34—34 thereof, and looking in the direction of the arrows.

FIGS. 1 through 5 show the machining center 10 provided with an optional pallet changer apparatus, generally indicated by the numeral 22. When the pallet changer apparatus 22 is employed, a pair of interchangeable pallets 18 and 19 are employed. When the optional pallet changer apparatus 22 is not employed, then the work table assembly 16 is provided with a work table 17, as shown in FIGS. 33 and 34. As shown in FIG. 1, an operator's control panel, generally indicated by the numeral 20, is operatively mounted on one side of the twin column assembly 11, and a second control panel, generally indicated by the numeral 21, is operatively mounted on the other side of the twin column assembly 11.

Twin Column Assembly

Figure 7:
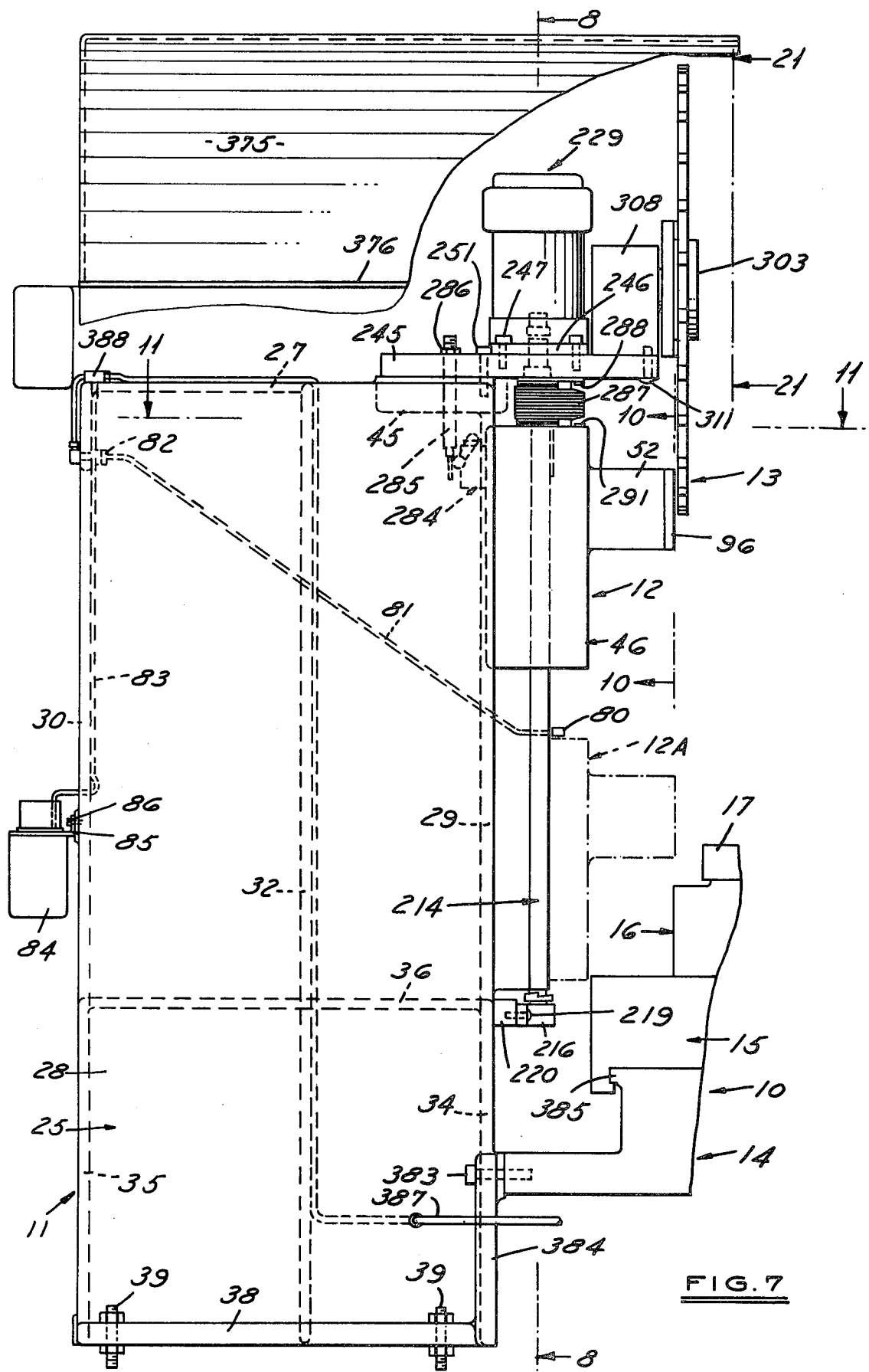
FIG. 7 is an enlarged, left side elevation view of the machining center structure illustrated in FIG. 3, with parts removed, taken along the line 7—7 thereof, and looking in the direction of the arrows.
Figure 8:
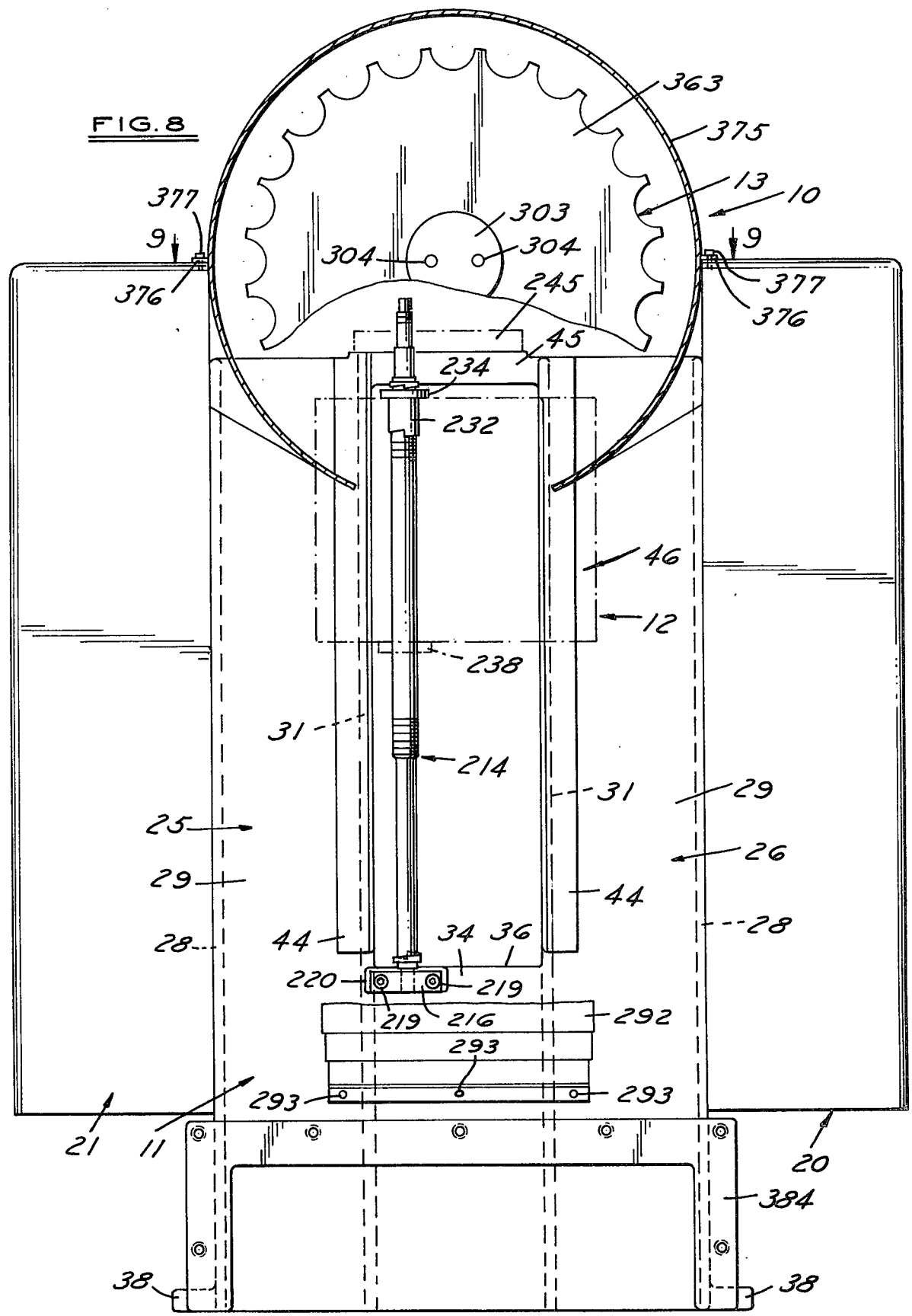
FIG. 8 is an elevation view of the machining center structure illustrated in FIG. 7, with parts broken away and parts in section, taken along the line 8—8 thereof, and looking in the direction of the arrows.
Figure 9:
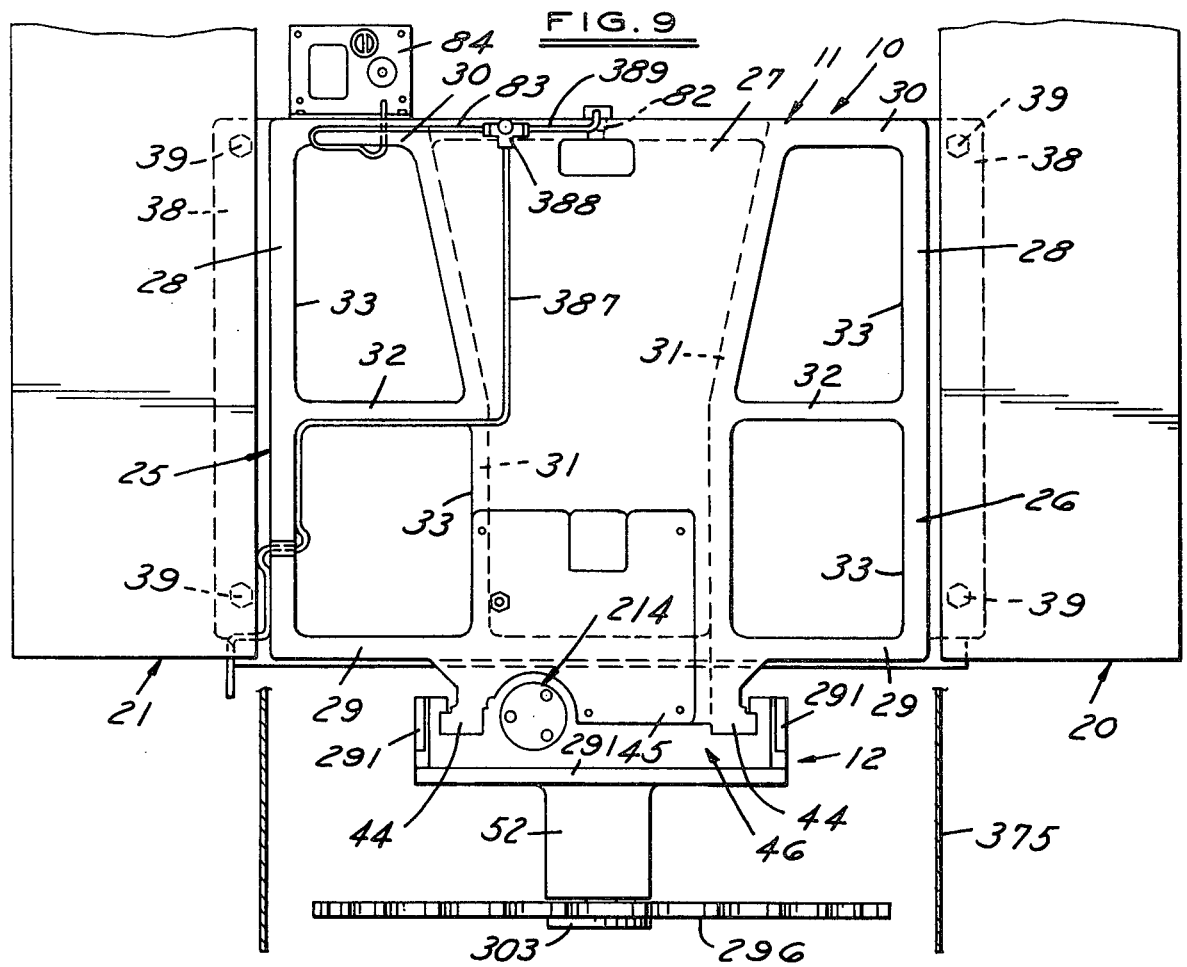
FIG. 9 is a top plan view of the machining center structure illustrated in FIG. 8, with parts removed, parts broken away, and parts in section, taken along the line 9—9 thereof, and looking in the direction of the arrows.
Figure 10:
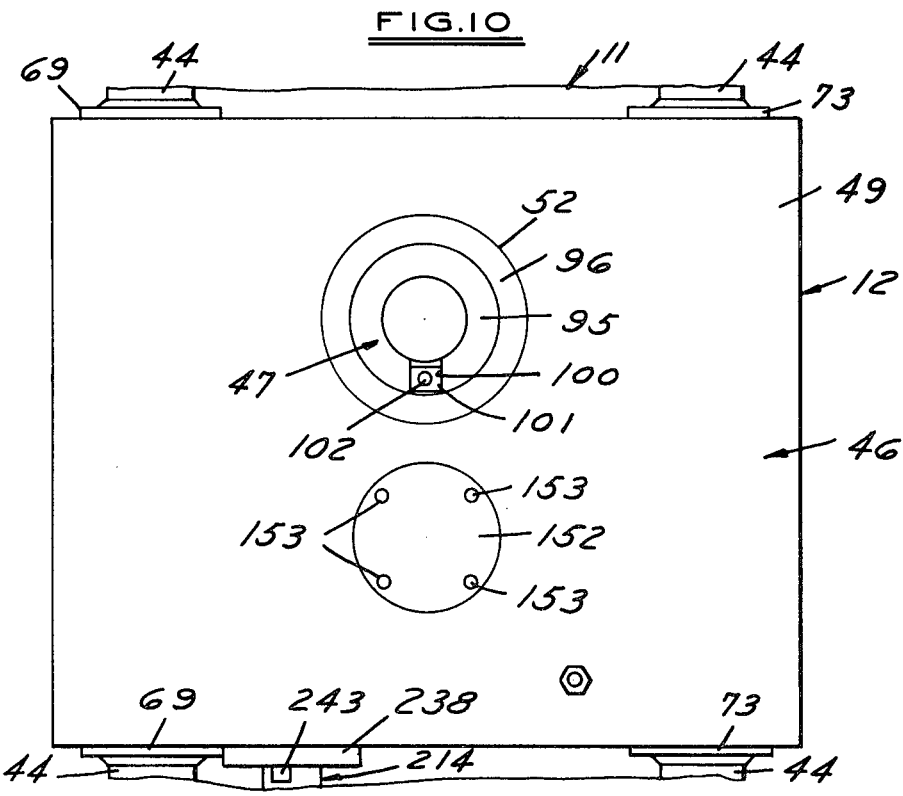
FIG. 10 is an enlarged, fragmentary, front elevation view of the spindle assembly employed in the machining center structure illustrated in FIG. 7, taken along the line 10—10 thereof, and looking in the direction of the arrows.

As shown in FIGS. 2, 8 and 9, the twin column assembly 11 includes a left column, generally indicated by the numeral 25, and a right column, generally indicated by the numeral 26. As shown in FIG. 9, a column assembly top plate 27 integrally connects the upper ends of the left and right columns 25 and 26, respectively. Each of the columns 25 and 26 includes a vertical outer side wall 28, a front wall 29, a rear wall 30, an inner side wall 31, and a transverse inner wall 32. The column assembly top plate 27 is provided with a plurality of openings 33. As shown in FIGS. 7 and 8, the lower ends of the columns 25 and 26 are connected by integral front and rear housing walls 34 and 35, respectively. The upper ends of the housing walls 34 and 35 are enclosed by a horizontal housing wall 36 (FIG. 7). As shown in FIG. 5, the upper ends of the columns 25 and 26 are also connected by front and rear vertical housing wall portions 37. As shown in FIGS. 5, 7 and 8, each of the columns 25 and 26 is provided along the lower side thereof with an integral, horizontal footing member or flange 38 through each of which is operatively mounted a pair of leveling screw jacks 39. The control boards 20 and 21 are operatively attached to the adjacent column assembly 11, by any suitable means, as by suitable machine screws (not shown).

As shown in FIG. 8, each of the columns 25 and 26 is provided along the front inner side with a longitudinally extended, and outwardly positioned "Y" or vertical axis ways 44 which are integral at their upper ends with a transverse extension plate 45 that extends forwardly from the column top plate 27.

Tool Spindle Slide Assembly

Figure 11:
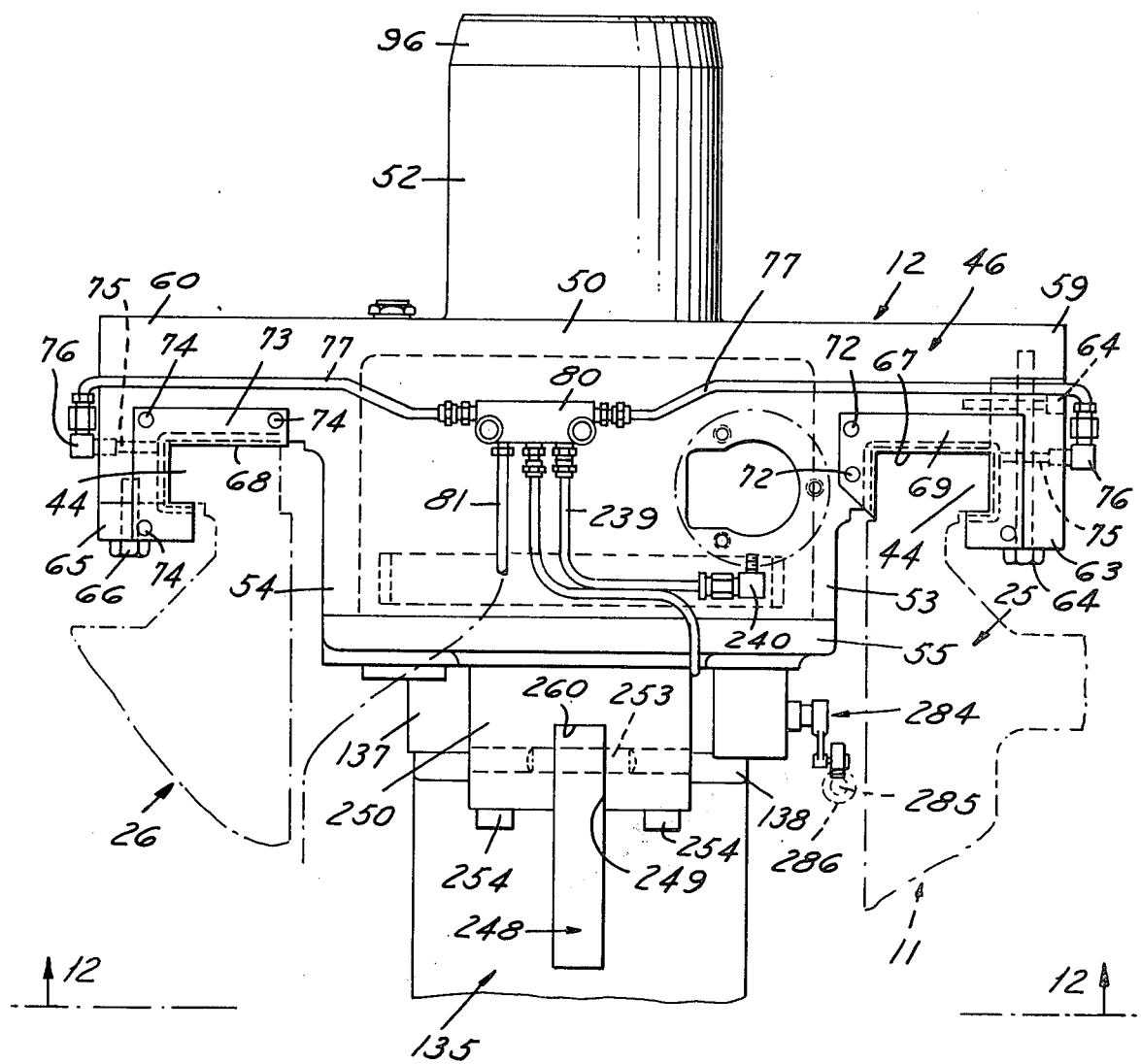
FIG. 11 is a horizontal view of the machining center structure illustrated in FIG. 7, with parts removed and parts broken away, taken along the line 11—11 thereof but turned 90°, and looking in the direction of the arrows.
Figure 14A:
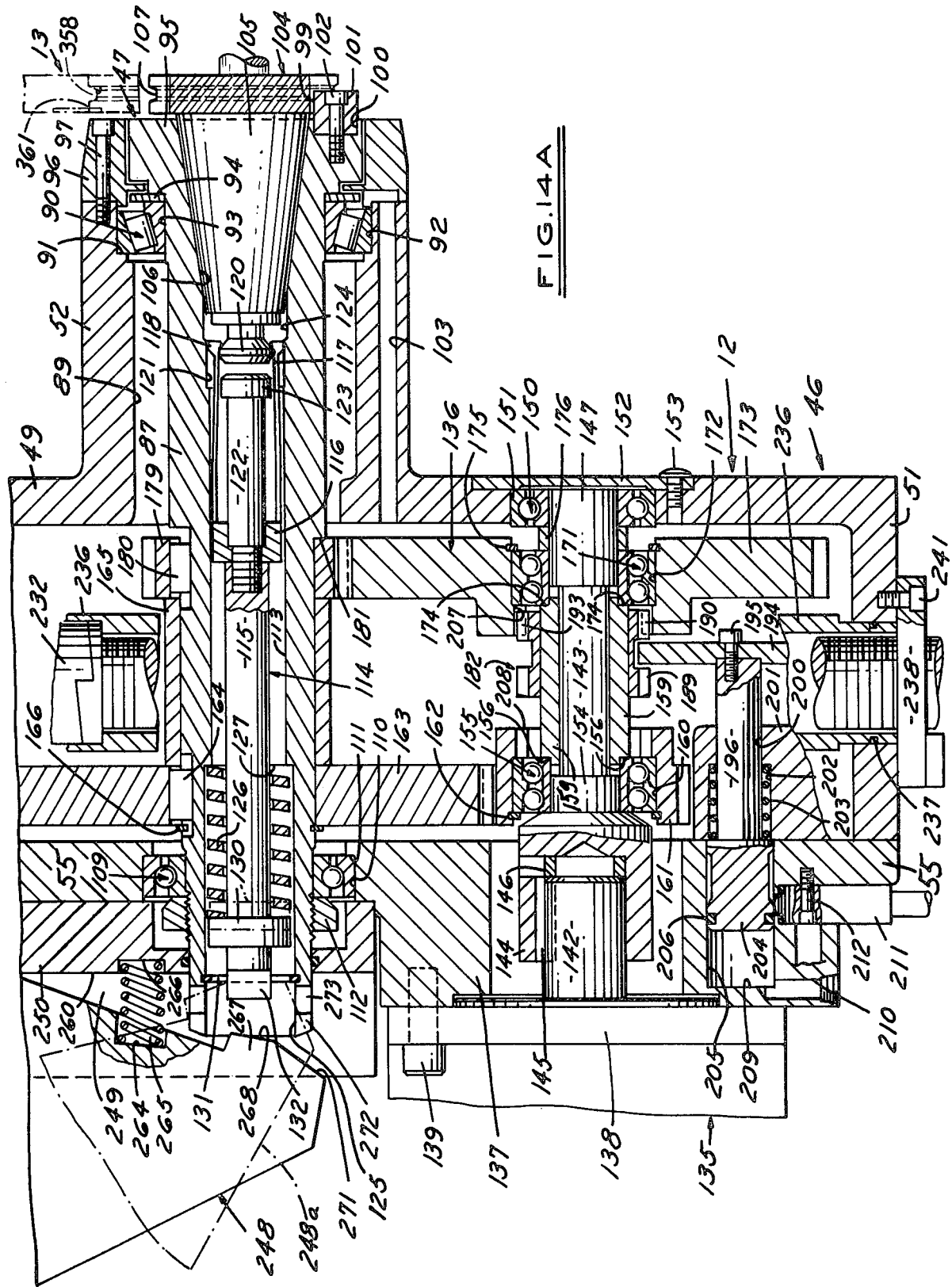
FIG. 14A is a fragmentary, enlarged elevation section view, similar to FIG. 14, of the spindle assembly structure employed in the machining center of the present invention.

The tool spindle slide assembly 12 is best seen in FIGS. 10, 11, 12, 14 and 14A. As shown in FIG. 14, the tool spindle slide assembly 12 includes the spindle slide housing, generally indicated by the numeral 46, and in which is rotatably mounted a tool spindle, generally indicated by the numeral 47. The spindle slide housing 46 includes a front wall 49, an integral top wall 50, and an integral bottom wall 51. As shown in FIG. 14A, the spindle slide housing 46 is also provided with an integral, forwardly extended horizontal cylindrical housing portion 52 in which is rotatably supported the front end of the tool spindle 47. As shown in FIG. 11, the spindle slide housing 46 is provided with a pair of rearwardly extended integral side walls 53 and 54 which are enclosed at the rear ends thereof by a rear end housing wall 55. As shown in FIG. 12, the rear housing wall 55 is releasably secured in place by a plurality of suitable machine screws 56.

The spindle slide housing 46 includes a pair of sidewardly extended arms 59 and 60, which are adapted to be slidably mounted on the outer faces of the vertical axis ways 44. As shown in FIG. 11, the housing arm 59 has secured to the rear side thereof an L-shaped keeper member 63 which is adapted to be slidably engaged with the outer face and a part of the rear face of one of the ways 44. The keeper 63 is secured to the housing arm 59 by any suitable means, as by a pair of machine screws 64. The other housing arm 60 is also provided with a keeper member 65 which is secured to a rearwardly extended portion of the arm 60 by a machine screw 66. The keepers 63 and 65 function with the housing arms 59 and 60 to provide the vertical axis slide ways 67 and 68. The slide way 67 is provided with a conventional way wiper 69 which is secured in place by suitable machine screws 72. The slide way 68 is also provided with a similar way wiper 73 which is secured in place by suitable machine screws 74. As shown in FIG. 11, the slide ways 67 and 68 are provided with suitable lubricant passageways 75 which are each supplied with lubricant through a fitting 76, and a nylon tubing 77. The tubes 77 are connected to a conventional lubricant meter unit 80 which is connected by a nylon tubing 81 to a fitting 82 which is mounted on the rear side of the column assembly 11, as shown in FIG. 7. Fitting 82 is connected by nylon tubing 83 to a lubricant supply unit 84 that is secured to the rear side of the column 25 by means of mounting flange 85 and a machine screw 86. As shown in FIGS. 14 and 14A, the tool spindle 47 includes an elongated tubular body 87 which is rotatably mounted at its forward end in the tubular housing 52 by a suitable roller thrust bearing, generally indicated by the numeral 90. As shown in FIG. 14A, the outer race of the bearing 90 is seated against a shoulder 91 formed at the junction point of the bore 89 in the housing 52, and an enlarged bore 92 in the housing 52. The inner race of the bearing means 90 is seated on an enlarged diameter portion 93 of the tool spindle body 87, and it is held in place by a slinger plate 94 which is seated against a shoulder formed on the enlarged outer end head 95 of the tool spindle body 87. A retainer ring 96 is secured to the outer end of the tubular housing 52 by any suitable means, as by suitable socket head screws 97.

A tool drive key 101 is operatively mounted in a recess 100 formed in the outer face of the spindle body head 95, and it is secured in place by a suitable socket head screw 102. The drive key 101 seats in the keyway 99 in the tool chuck 104 for locating and driving purposes. As shown in FIG. 14A, the bearing means 90 is lubricated by a suitable lubricant admitted through the passage 103 from the interior of the housing 46.

As shown in FIG. 14A, a conventional tool holder or tool chuck, generally indicated by the numeral 104, is provided with a tapered shank 105 that is adapted to be operatively seated in a tapered socket 106 formed in the outer end of the tool spindle body 87. The tool chuck 104 is provided with a conventional peripheral V-groove 107, on the outer end thereof, for operative engagement with the tool storage carousel means 13, as described hereinafter. The tool chuck 104 is illustrative of the type tool holders which may be employed with the tool spindle 47 for carrying various types of tools, as indicated by the numeral 108 in FIG. 1.

As shown in FIG. 14A, the inner end or rear end of the tool spindle body 87 is rotatably supported by a suitable bearing means 109 which is operatively mounted in a bore 110 in the housing rear wall 55. The bearing 109 is retained against a retaining shoulder 111 at the inner end of the bore 110 by a suitable lock nut 112 which is threadably mounted on the rear end of the tool spindle body 87.

The tool spindle body 87 is provided with a longitudinal axial bore 113 in which is longitudinally movable a draw bar means generally indicated by the numeral 114. The draw bar means 114 includes an elongated cylindrical body or rod 115, to the front end of which is attached a collet body 116 of a collet type tool holder gripping means. A plurality of collet fingers 117 are integrally connected to the collet body 116 and they are provided on their outer ends with integral cam heads 118. As shown in FIG. 14A, the draw bar means 114 is in the operative or tool holder gripping means position with the collet fingers 117 cammed inward to bring the cam heads 118 into a gripping engagement with the retention knob 120 of the illustrated self-locking tool chuck 104. It will be seen that when the draw bar body 115 is moved to the position shown in FIG. 14A, that the collet cam heads 118 are moved rearwardly into a bore portion 121 which cams the collet finger cam heads 118 radially inward into locking engagement with the tool chuck retention knob 120. When the draw bar means 114 is operated so as to move the draw bar body 115 to the right from the locking position shown in FIG. 14A, to a tool holder released position, the collet cam heads 118 are moved to the right into an enlarged bore portion 124 which communicates with the tapered socket 106. When the collet finger cam heads 118 are in the relaxed or inoperative position in the enlarged bore portion 124, they are in the position shown in FIG. 16. That is, they are not flexed radially outward, but the outer peripheries thereof form a cylindrical configuration with the outer configuration of the collet body 116. The prior art type collet means all have collet fingers which are expandible radially outward beyond the periphery of the corresponding collet body 116 when in the released or inoperative position.

The collet body 116 is secured to the front end of the draw bar body 115 by a suitable retainer bolt 122 which has an enlarged head 123 that is adapted to engage the tool chuck retention knob 120 when the draw bar body 115 is moved to the right from the locking position shown in FIG. 14A so as to unlock the self-locking tool chuck 104. As shown in FIG. 14A, the draw bar means 114 is in the operative or locking position wherein the tool chuck 104 is held in a locked position in the tapered socket 106 by the collet tool holding means comprising the collet body 116, the collet fingers 117 and the collet cam heads 118.

As shown in FIG. 14A, the tool spindle body 87 is provided in the rear end portion thereof with an enlarged axial bore 125 which is made to a larger diameter than the central bore 113 with which it communicates.

A draw bar spring 126 is mounted in the bore 125 with its forward end disposed against a shoulder 127 formed at the junction of the bores 113 and 125. The rear end of the spring 126 is seated against an integral peripheral flange 130 on the draw bar body 115. It will be seen that when the spring 126 is in the position shown in FIG. 14A that it holds the draw bar body 115 in the operative tool holder locking position. The draw bar means 114 can be moved to the right from the position shown in FIG. 14A against the retractive force of the spring 126 by a draw bar release means described more fully hereinafter. A retainer ring 131 is mounted in the bore 125 in a position outward of the flange 130 to retain the draw bar means 114 in the tool spindle body 87. The numeral 132 in FIG. 14A indicates the position of the rear end of the draw bar body 115 when the draw bar means 114 is moved to the right to the inoperative or tool holder released position.

As illustrated in FIG. 14A, a high response direct current electric servo motor, generally indicated by the numeral 135, is operatively mounted on the rear side of the spindle slide housing 46, for driving a drive gear means 136 for rotating the tool spindle 47 by means of the following described structure. Motor 135 is provided with a mounting flange 138 that is seated on the enlarged portion 137 of the spindle housing rear wall 55. The motor mounting flange 138 is secured to the housing wall 137 by suitable machine screws 139.

As shown in FIG. 14A, the spindle drive motor 135 is provided with an output shaft 142, which is operatively connected to the enlarged input end 144 of a drive gear shaft 143. The motor output shaft 142 is connected to the shaft end 144 by a suitable key 145 and a spacer 146. The gear shaft 143 is provided with an enlarged diameter journal 147 at the front end which is rotatably supported by a suitable ball bearing means, generally indicated by the numeral 150. The bearing means 150 is operatively mounted in a bore 151 formed through the spindle housing front wall 49, and it is engaged on its outer side by a cover plate 152 which is secured in place by suitable button socket head screws 153.

The gear shaft 143 is provided with an enlarged journal portion 154 around which is operatively mounted a gear supporting ball bearing means, generally indicated by the numeral 155. The inner race of the bearing means 155 is seated between the enlarged shaft portion 144 and shoulders 156 formed on the left sides of two drive keys 159. The outer race of the bearing means 155 is operatively mounted in a bore 160 formed axially in a pinion gear 161. The outer bearing race of the bearing means 155 is held against a shoulder formed in the bore 160 by a suitable retainer ring 162. It will be seen that the pinion gear 161 is mounted on the gear shaft 143 in a freely rotatable condition.

The pinion gear 161 is meshed with and adapted to drive a larger diameter low speed gear 163 which is mounted on the tool spindle body 87 and operatively connected thereto by a suitable key 164. The low speed gear 163 is seated against the rear end of a spacer sleeve 165 and retained thereagainst by a retainer ring 166.

Figure 19:
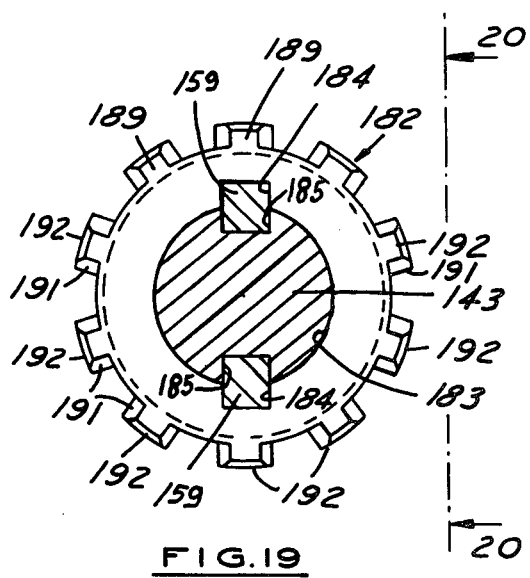
FIG. 19 is a fragmentary, elevation section view of the spindle assembly illustrated in FIG. 14, taken along the line 19—19 thereof, looking in the direction of the arrows, and showing the clutch employed in the spindle assembly.
Figure 20:
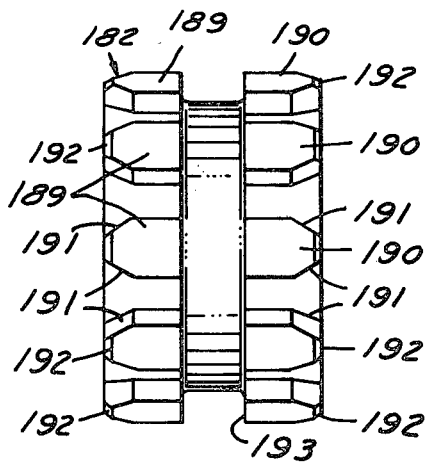
FIG. 20 is a side elevation view of the clutch shown in FIG. 19, taken along the line 20—20 thereof, and looking in the direction of the arrows.

As shown in FIG. 14A, a ball bearing means, generally indicated by the numeral 171, is operatively mounted on the front end journal 147 of the gear shaft 143. The outer race of the bearing means 171 is seated in a bore 172 formed axially through a large diameter high speed gear 173. The outer bearing race of the bearing means 171 is secured in place by a retainer ring 175. The inner end of the last mentioned outer bearing race is seated against shoulders 174 formed on the right sides of the two drive keys of the clutch mounting sleeve 159. The bearings 150 and 171 are retained in their spaced apart positions by a spacer sleeve 176. It will be seen that the high speed gear 173 is mounted by the bearing means 171 on the gear shaft 143 in a freely rotatable condition. As shown in FIG. 14A, the high speed gear 173 is meshed with a pinion gear 179 which is operatively mounted on the tool spindle body 87. The pinion gear 179 is locked in place on the tool spindle body 87, against the forward end of the spacer sleeve 165, by a suitable key 180. The gear 179 has its front end seated against a shoulder 181 formed on the tool spindle body 87. As shown in FIG. 14A, a gear clutch, generally indicated by the numeral 182, is provided for selective connection of either the low speed gear 163 or the high speed gear 173 to the gear shaft 143 to provide a desired driving rotation to the tool spindle 47. As shown in FIG. 19, the clutch 182 is a gear type or spline clutch which has an axial bore 183 in which is slidably received the drive shaft 143. As shown in FIG. 19, a pair of diametrically disposed keys 159 are slidably mounted in mating slots 184 and 185 formed in the clutch 182 and gear shaft 143, respectively. As shown in FIG. 20, the clutch 182 is provided with two peripheral sets of spaced apart gear teeth 189 and 190 which are spaced apart by a peripheral groove 193. As shown in FIGS. 19 and 20, each of the gear teeth 189 and 190 is provided with chamfers 191 along the side faces thereof which are sloped so as to converge outwardly. The outer, upper edges of each of the teeth 189 and 190 are also chamfered, as indicated by the numerals 192.

As shown in FIG. 14A, a clutch shifter disc 194 is secured by machine screw 195 to one end of a piston rod 196. The piston rod 196 is slidably mounted through a bore 200 in a housing 201 which is carried on the inside of the spindle housing rear wall 55. The bore 200 communicates with a spring chamber 202 in which is operatively mounted a coil spring 203. One end of the spring 203 is seated against the front end of the spring chamber 202, and the other end abuts the front end of a piston 204 which is integral with the rod 196 and slidably mounted in a cylinder 205 formed in the enlarged housing wall portion 137 of the spindle housing 46. The piston 204 is provided with a suitable O-ring seal 206. A passage 210 is formed in the housing wall portion 137, and it has its inner end in communication with the rear end 209 of the piston cylinder 205. The outer end of the passage 210 is adapted to be connected to a suitable source of air under pressure for admitting air under pressure into the cylinder 205 for moving the piston 204 forwardly into the advanced position shown in FIG. 14A against the pressure of spring 203 to move the clutch 182 into the position shown in FIG. 14A to connect the drive motor 135 with the high speed drive gear 173. When the air pressure is exhausted from the cylinder 205, the spring 203 moves the shifter disc 194 to the left, from the position shown in FIG. 14A, and the piston 204 will be moved rearwardly or to the left as viewed in FIG. 14A into abutment with the end 209 of the piston chamber 205. In the last mentioned position, the clutch 182 would be moved to the left to engage the pinion gear 161 for driving the low speed drive gear 163. In the position shown in FIG. 14A the clutch gear teeth 190 are in operative driving relationship with the internal mating teeth 207 formed in the high speed gear 173. When the clutch 182 is moved to the left, the clutch or spline teeth 189 are moved into driving engagement with the internal teeth 208 formed in the gear 161. The function of the chamfers 191 and 192 on the clutch teeth 189 and 190 is to permit efficient meshing of the gear clutch 182 with either the gear teeth 207 on the gear 173 or the gear teeth 208 on the gear 161. An enclosed type micro-switch 211 is secured by suitable machine screws 212 in the housing wall 137 in a position for operative engagement with the piston 204 when it is moved between the advanced position shown in FIG. 14A and its retracted position, or a position moved to the left from that shown in FIG. 14A. It will be understood that the drive motor 135 drives the tool spindle 47 clockwise or counterclockwise, through either the low speed gear 161 or the high speed gear 173.

It will be seen that the clutch 182 provides the spindle 47 with two speed ranges relative to the speed of the drive motor 135. The drive motor 135 rotates the spindle 47 in a clockwise or counterclockwise direction. It will also be seen that spring 203 shifts the spindle drive means into the low range, while air pressure is employed to shift the drive means into the high range. The micro-switch 211 signals that the spindle drive means is either in the high range or the low range. Any suitable pneumatic controls may be provided for feeding the pressurized air in and out of the cylinder 205 for operating the clutch shift piston 204.

As shown in FIGS. 7, 8 and 14, the tool spindle slide assembly 12 is moved upwardly and downwardly along the "Y" axis by a ball screw assembly, generally indicated by the numeral 214. As shown in FIG. 14, the lower end 215 of the lead screw for the ball screw assembly 214 is rotatably mounted in a suitable bearing means (not shown) which is held in a support bracket 216. The support bracket 216 is secured by suitable machine screws 219 to a mounting pad 220 that is fixedly carried on the column assembly front wall 34. As shown in FIG. 14, the upper end of the ball screw assembly 214 is rotatably mounted in a pair of ball bearing means 221 which are seated in a bore 222 formed in a downward extended portion of a mounting plate 245. As shown in FIG. 14, the mounting plate 245 is secured to the column assembly top wall 45 by any suitable means, as by suitable machine screws 251. The bearing means 221 are retained in the bore 222 by a retainer plate 223 secured in place by suitable machine screws 224. The ball screw assembly 214 is secured in place axially by a spacer 225 and a lock nut 226, which is threadably mounted on the upper end thereof. As illustrated in FIGS. 14 and 15, the upper end 228 of the ball screw assembly 214 is operatively connected by a key 230 and set screws 231 to the hollow output shaft 227 of a direct current servo motor, generally indicated by the numeral 229, which is similar to the spindle drive motor 135. The drive motor 229 has a mounting flange 246 which is secured to the mounting plate 245 by suitable machine screws 247.

As shown in FIG. 14, a stop member 235 is carried on the upper end of the lead screw nut mounting plate 233 for operative engagement with a stop member 242 when the spindle housing 46 reaches the upper end of its travel. A stop ring 238 is fixed by suitable machine screws 241 to the lower side of the housing lower wall 51. The stop ring 238 carries a stop member 243 which engages the stop member 244 when the spindle housing 46 reaches the lower end of its travel. As illustrated in FIG. 11, the ball screw assembly 214 is provided with lubricant through an oil fitting 240 which is connected by a nylon tubing 239 to the lubricant distribution unit 80.

As shown in FIGS. 12 and 14, the tool spindle slide assembly 12 includes a pivotally mounted and mechanically operated wedge means, generally indicated by the numeral 248, which radially locates the position of the tool chuck 104 and the respective tool 108 carried therein, and which also releases or unlocks the tool chuck 104 from the tapered socket 106 in the tool spindle 47. The unlocking and locating wedge means 248 is substantially triangular in side elevation view, as shown in FIG. 14. The wedge means 248 is swingably mounted in a slot 249 (FIG. 11) which is formed in the rear face of a pivot block 250. The pivot block 250 is secured to the rear face of the spindle housing rear wall 55 by a plurality of suitable machine screws 254. The wedge means 248 is pivoted at its inner upper corner in the slot 249 by a suitable dowel pivot pin 253. As shown in FIG. 14, the wedge means 248 is normally biased in a clockwise direction, into an inoperative position shown in FIG. 14, by a suitable coil spring 265 which has its inner end seated in a recess 266 (FIG. 14A) formed in the inner surface 260 of the slot 249 in the pivot block 250, in a position facing the slot 249. The outer end of the spring 265 is seated in a recess 264 which is formed on the inner face of the wedge means 248.

As shown in FIG. 14A, when the wedge means 248 is pivoted in a counterclockwise direction or inwardly toward the spindle 47, as described hereinafter, the wedge means 248 assumes an operative position indicated by the numeral 248a. When the wedge means 248 is in the operative position 248a, the upper side 255 thereof (FIG. 14) is substantially horizontal and parallel to the top of the spindle housing 46. An integral, upwardly extended projection or stop member 256 is formed on the upper outer end of the wedge means 248. When the tool spindle slide assembly 12 is moved upwardly to the position shown in FIG. 14, the stop member 256 on the wedge means 248 engages the lower flat end 257 formed on the bottom end of a positive stop block 258. Continued upward movement of the tool spindle slide assembly 12 for about the last one inch of upward travel mechanically pivots the wedge means 248 in a counterclockwise direction, as viewed in FIG. 14, to move it into the operative position 248a, as shown in FIG. 14A. The positive stop block 258 is secured to the underside of the mounting block 245 by any suitable means, as by suitable machine screws 261.

As shown in FIG. 14, when the wedge means 248 is biased to the solid line, inoperative position, the wedge means has an angle contact surface 263, which is formed along the upper inner edge thereof, and which is adapted to abut against an inner surface 260 of the slot 249. The contact surface 263 is angled inwardly toward the wedge means upper end surface 255, and its lower end terminates at the upper end of a second contact surface 262 which is adapted to be seated against the slot inner surface 260 when the wedge means 248 is cammed in a counterclockwise direction to the operative broken line position, indicated by the line 248a in FIGS. 14 and 14A, for unlocking the tool spindle 47.

As stated hereinbefore, when the tool spindle slide assembly 12 reaches its approximately last one inch of upward travel, the stop member 256, on the upper end of the wedge means 248, engages the positive stop block 258 and cams the wedge means 248 in a counterclockwise direction, as viewed in FIG. 14. As shown in FIG. 14A, the wedge means 248 has an outwardly extended contact end 267, on the inner side thereof, which has a first contact surface 268 on the upper outer edge that is adapted to be moved into a transverse slot 272 formed in the outer rear end of the tool spindle 47. Continued upward movement of the tool spindle slide assembly 12 moves the wedge means 248 in the counterclockwise direction so as to move the contact end 267 further inwardly, into the adjacent slot 273 formed in the rear end of the tool spindle 47, and to bring the contact surface 268 into engagement with the rear end of the drawbar body 115. Continued pivoting inward movement of the wedging means 248 pivots the contact surface 268 upwardly off of the rear end of the draw bar body 115, and brings the lower contact surface 271 on the wedging means contact end 267 into sliding engagement with the rear end of the draw bar body 115. It will be seen that the wedge means contact surfaces 268 and 271 are angled rearwardly or toward the main body of the wedging means 248. Continued counterclockwise movement of the wedging means 248, during the last portion of the upward travel of the tool spindle slide assembly 12, moves the draw bar body 115 to the right, as viewed in FIGS. 14 and 14A, so as to engage the draw bar head 123 with the retainer knob 120 of the tool chuck 104 for unlocking the tool chuck 104. When the last mentioned condition is reached, the stop member 256 is then seated flat against the lower flat or horizontal surface 257 of the positive stop block 258. As shown in FIG. 12, the outer slot 272 in the rear end of the tool spindle 47 is made to a larger width than the width of the inner slot 273, so as to allow the wedging means 248 to enter the slot 273 before the tool spindle 47 is finally located in its final position. When the wedging means 248 enters the inner slot 272, it enters said slot in a sliding relation so as to radially locate the tool spindle 47 in the desired tool changing position, with the tool chuck 104 in a desired tool changing position and in an unlocked condition. It will be seen that the wedge means 248 knifes its way into the slots 272 and 273, and then radially locates the tool spindle 47 and unlocks the tool chuck 104 in a purely positive mechanical action. The tool spindle 47 is roughly located relative to its finally desired radial position, by the following described magnet means and sensing means.

As illustrated in FIGS. 12 and 13, the low speed gear 163 of the tool spindle drive gear means has a bore 274 formed therethrough in which is operatively mounted, as by a press fit, a cylindrical permanent magnet 275. As shown in FIG. 13, the outer face of the permanent magnet 275 is positioned adjacent the rear face 279 of the low speed gear 163. In one embodiment the magnet 275 is ⅜ of an inch in diameter. A conventional proximity switch 276 is fixed by a suitable socket head screw 277 on a switch support arm 278 in a position axially spaced apart from the magnet 275. The support arm 278 and the proximity switch 276 are positioned in a bore 281 formed through the spindle housing rear end wall 55. The switch support arm 278 is fixed, as by welding, to the inner face of a switch bracket 282 which comprises a plate that is mounted over the outer side of the bore 281 and secured in position by suitable machine screws 283. The machine screws 283 pass through suitable slots 280 formed in the switch bracket 282 to permit the bracket 282 to be adjusted, for adjusting the position of the proximity switch 276 relative to the magnet 275 when the gear 163 and spindle 47 are in the desired tool change position to radially locate the tool spindle 47 and the tool chuck 104 carried therein. A suitable proximity switch is one available on the market from Hamlin Inc., Lake End and Grove Streets, Lake Mills, Wisconsin, and sold under Model No. 5901.

As shown in FIGS. 7, 11 and 12, a micro-switch, generally indicated by the numeral 284, is fixedly mounted on the upper end of the rear face of the tool spindle housing rear wall 55 by any suitable means. As best seen in FIG. 7, an elongated threaded rod 285 is threadably mounted through the mounting plate 245, and it is fixed in a desired adjusted position by a lock nut 286. The lower end of the threaded rod 285 is adapted to be engaged by the micro-switch 284 when the tool spindle slide assembly 12 reaches the end of its upward travel so as to shut off the drive motor 229 for the "Y" axis ball screw assembly 214. The drive motor 135 for the tool spindle 47 would have been previously shut off when the tool spindle slide assembly 12 reaches the position shown in FIG. 14, at the point where the tool spindle slide assembly 12 is entering its last one inch of travel. The spindle drive motor 135 is programmed to turn through a slow index cycle preparatory to stopping, and when the magnet 275 reaches the position shown in FIG. 13, opposite to the proximity switch 276, a signal is created which shuts off the power to the tool spindle drive motor 135, and the tool spindle 47 stops in a location where it is roughly located, radially, in a desired tool changing position. The aforedescribed inward swinging movement of the wedge means 248 into the tool spindle slots 272 and 273 carries out the final radial locating of the tool spindle 47, and the unlocking of the tool chuck 104 carried in the tool spindle 47.

As shown in FIGS. 1 and 7, the tool spindle slide assembly 12 is provided with a bellows 287 on the upper end thereof for protection against dirt. As shown in FIG. 7, the upper end of the bellows 287 is attached by a suitable mounting plate means 288 to the underside of the mounting plate 247. The lower end of the bellows 287 is fixed by a suitable bellows mounting plate 291 to the top of the tool spindle slide assembly 12. As shown in FIG. 8, a similar bellows 292 is also mounted on the lower side of the tool spindle slide assembly 12, and with the upper end thereof being attachable to the lower end of the tool spindle slide assembly 12 by a mounting plate similar to the mounting plate 291. The lower end of the bellows 292 is fixed by any suitable means, as by machine screws 293, to the front side of the column assembly front wall 34.

Tool Storage and Tool Changer Carousel Means

Figure 22:
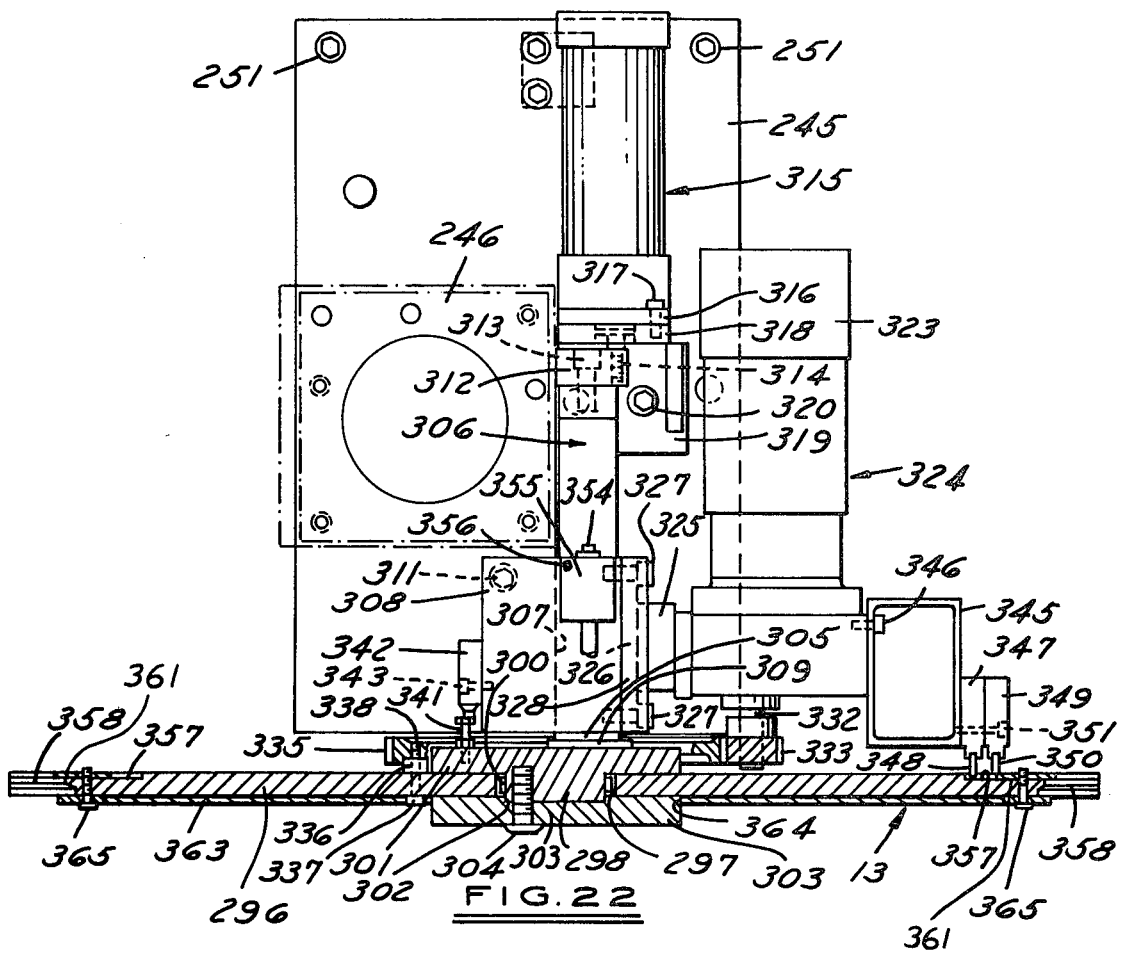
FIG. 22 is a top plan view of the machining center structure illustrated in FIG. 21, taken along the line 22—22 thereof, and looking in the direction of the arrows.

As shown in FIG. 22, the tool storage and tool changer carousel means 13 includes a carousel wheel or circular plate 296 which is provided with a central bore 297. The carousel wheel 296 is rotatably mounted on the circular hub 298 of a circular carrier plate 301 by a suitable needle bearing means 300. The carrier plate hub 298 extends forwardly beyond the carousel wheel 296 into a circular recess 302 which is formed in the inner side of a circular retainer plate 303. The retainer plate 303 retains the carousel wheel 296 on the carrier plate 301. The retainer plate 303 is secured in place by suitable machine screws 304.

As shown in FIG. 22, the front end 305 of a square carrier shaft, generally indicated by the numeral 306, is fixedly secured to a mounting spacer plate 309 on the rear face of the carrier plate 301, by any suitable means, as by welding. The square carrier shaft 306 is slidably mounted in a square bore 307 in a support housing 308. The support housing 308 is fixed on the mounting plate 245 by any suitable means, as by suitable machine screws 311. The rear end of the square carrier shaft 306 is fixed by suitable mounting screws 313 to a mounting plate 312. The mounting plate 312 is fixedly secured to the outer end of a cylinder rod 314 of a suitable air cylinder, generally indicated by the numeral 315, and which is adapted to be connected to a suitable source of air under pressure. The air cylinder 315 is provided with a mounting flange 316 which is secured by machine screws 317 to the vertical flange 318 of a suitable mounting bracket which has an integral horizontal flange 319 that is secured by suitable machine screws 320 to the mounting block 245. It will be seen that the cylinder rod 314 is in the retracted position, and accordingly, the carrier shaft 306 and the carousel 13 are in the retracted or tool changing position. When the air cylinder 315 is energized to move the cylinder rod 314 outwardly, the carousel 13 is moved outwardly from the retracted tool changing position shown in 22 away from the stationary support housing 308 to the advanced position shown in FIG. 48, and which is indicated by the numeral 13a. In the advanced position 13a, the carousel 13 may be rotated in a clockwise or counterclockwise direction to bring the next desired tool into a tool changing position, after which the carousel means 13 is then retracted to the solid line position shown in FIG. 14 and FIG. 22.

Figure 21:
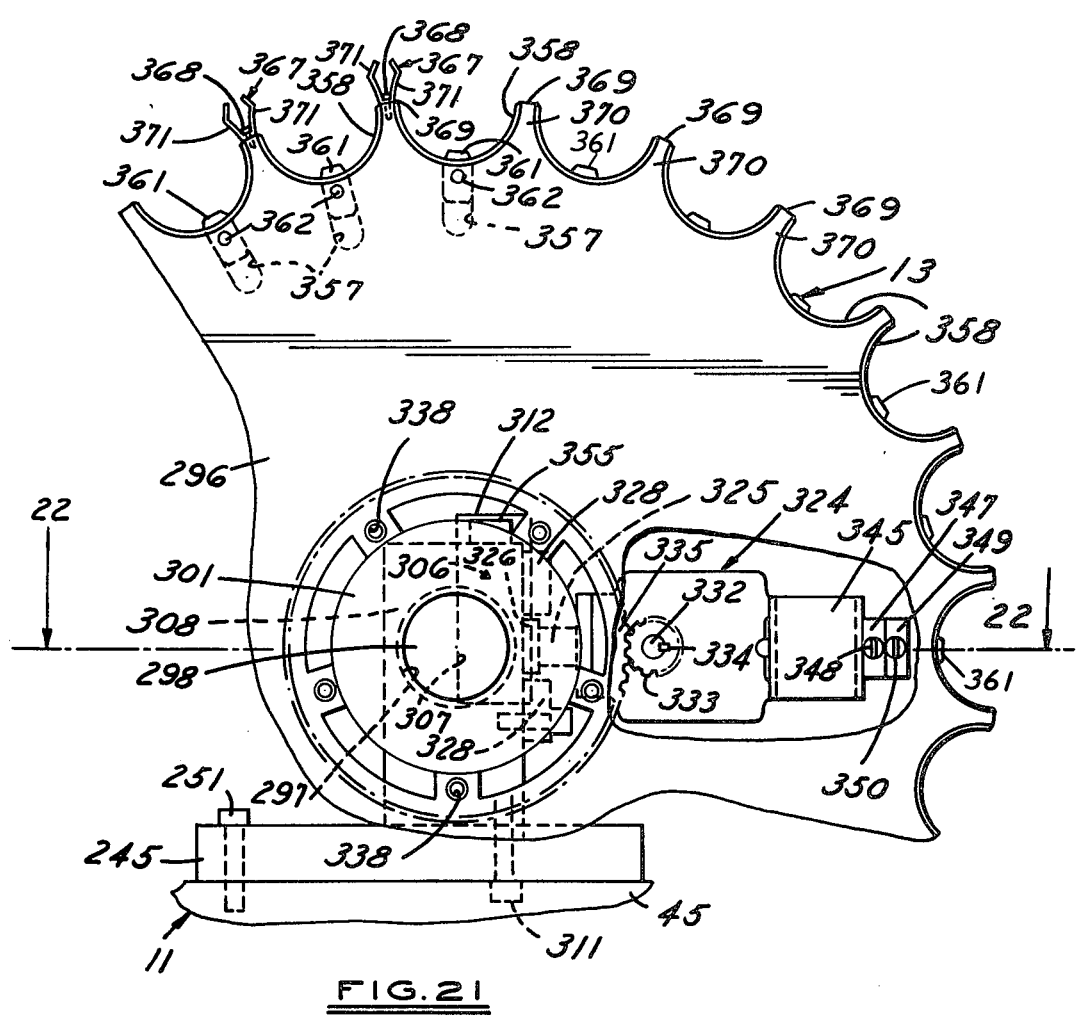
FIG. 21 is a fragmentary, enlarged, front elevation view of the carousel type tool changer illustrated in FIG. 7, taken along the line 21—21 thereof, and looking in the direction of the arrows.

The carousel means 13 is rotated by a suitable alternating current electric motor, generally indicated by the numeral 324 in FIG. 22. The drive motor 324 is a suitable gear motor with a disc brake 323. The carousel drive motor 324 is fixedly mounted on a carrier arm 325 which is secured to a carrier plate 326 that is secured to one side of the square carrier shaft 306 for moving the drive motor 324 in unison with the carousel 13. The carrier arm 325 and carrier plate 326 are slidably mounted between a pair of keeper plates 328 which are fixed to the stationary support housing 308 by any suitable means, as by machine screws 327. As shown in FIG. 21, a pinion drive gear 333 is fixedly secured to the output shaft 332 of the drive motor 324 by a suitable key 334. Pinion gear 333 meshes with and drives a carousel drive gear 335 which is fixedly secured to the carousel plate 296 by a plurality of suitable machine screws 337. Machine screws 337 extend through the carousel wheel 296 and through suitable spacers 336 and into threaded holes 338 formed in the gear 335.

As shown in FIG. 22, a hexagonal head machine screw 341 is adjustably mounted on the rear face of the carrier plate 301 for actuating a micro-switch 342 which is secured by machine screw 343 to one side of the fixed housing 308. The machine screw 341 functions as a switch operator for engaging the micro-switch 342, for actuating the same when the carousel means 13 reaches the retracted position, as shown in FIG. 22, at the end of a retractive movement to provide a control signal.

Figure 48:
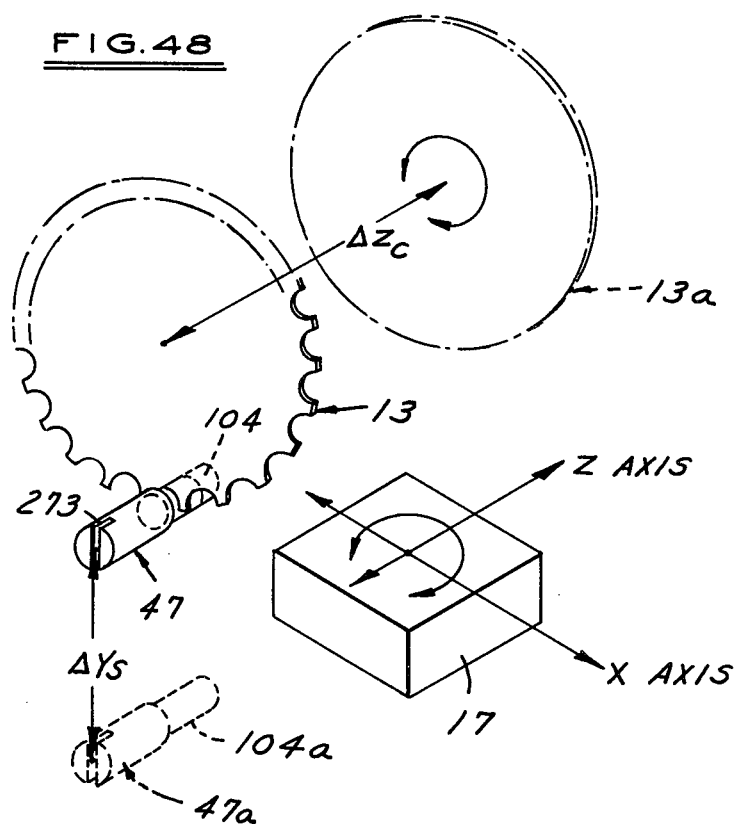
FIG. 48 is a perspective, schematic view of the carousel type tool changer and machine tool spindle, and showing the relative movements thereof during a tool changing operation.

A micro-switch 354 is mounted on top of the fixed housing 308 and includes a housing 355 which is secured by a machine screw 356 to the top of the housing 308. The micro-switch 354 is adapted to be actuated by the mounting plate 312 when the square carrier shaft 306 is advanced into the fully extended position, as indicated in FIG. 48, by the numeral 13a. The air cylinder 315 is adapted to be operated by a suitable signal which, when it is energized to extend the carousel means 13 outwardly, the drive motor 324 is also energized for rotating the carousel means 13 in the desired direction. The drive motor 324 is adapted to rotate the carousel 13 in a desired direction at a desired r.p.m., as for example, in one embodiment the carousel 13 is rotated at 3 r.p.m. It will be seen that the square carrier shaft 306 functions with the fixed housing 308 to provide a transverse slide means for the tool storage carousel means 13.

As shown in FIG. 22, a switch mounting bracket 345 is fixed by suitable machine screws 346 to the outer side of the housing of the motor 324, so as to be carried therewith. A pair of micro-switches 347 and 349 are fixed in a side-by-side position on the bracket 345, by a suitable machine screw 351. The micro-switches 347 and 349 are provided with operating arms 348 and 350, respectively, which are adapted to engage the slots 357 as the carousel wheel 296 is rotated, for a counting function as explained more fully hereinafter. As illustrated in FIG. 21, each of the slots 357 is disposed on a radius line, and they are elongated and disposed at the innermost point of a tool receiving seat or socket 358. As shown in FIG. 1, the carousel means 13 is provided with 24 of the tool seats or slots 358. Each of the tool slots 358 is semi-circular in plan configuration. As shown in FIG. 21, a locator finger 361 in the form of an elongated bar is slidably mounted in the outer end of each of the radial slots 357 and secured in an adjusted position by a suitable machine screw 362. The locator fingers 361 are adapted to engage in the annular groove 107 on a tool chuck 104 during a tool changing operation, and when a tool chuck 104 is inserted into one of the tool slots 358.

As shown in FIG. 22, an annular retainer plate 363 is mounted on the outer face of the carousel wheel 296, and it is provided with a central hole 364 therethrough for mounting the plate 363 around the retainer plate 303. The retainer plate 363 is secured in position on the carousel wheel 296 by suitable machine screws 365.

As shown in FIG. 21, a tool retainer clip, generally indicated by the numeral 367, is fixedly secured by a suitable machine screw 368 on each of the outer peripheral faces 369 of the radially extended arms 370 on the carousel wheel 296 that form the tool seats or slots 358. Each of the tool retainer clips 367 is provided with a pair of sidewardly extended clip arms 371, so as to provide a clip arm 371 on each side of each tool slot 358. It will be seen from FIG. 48 that when the tool spindle 47 is moved from a lowered, metal cutting position indicated by the broken line spindle 47a, to a raised tool changing position indicated by a solid line spindle 47, that the tool chuck 104 carried in the tool spindle 47 will be moved into the lowermost tool seat 358 on the carousel wheel 296. The spring clip arms 371 function to grip the sides of a tool chuck 104 when it is inserted into a tool slot 358 and releasably retain the same therein. It will be understood that each of the tool seats 358 will have retained therein a tool chuck 104 by means of spring clip arms 371. As shown in FIG. 8, the carousel means 13 may be provided with a suitable cover means 375 which is provided with a flange 376 on each side thereof. The flanges 376 are adapted to be secured to the top of the control panels 20 and 21 by suitable machine screws 377.

"X" Axis Base

As shown in FIGS. 23, 24 and 25, the "X" axis base 14 is provided with integral flanges on the front and rear thereof which are adapted for mounting conventional leveling screws 382. As illustrated in FIG. 24, the base 14 is substantially rectangular in overall plan view, and is secured by suitable machine screws 383 to a mounting flange structure 384 formed on the front of the column assembly 11 (FIG. 8). As shown in FIGS. 24 and 25, the base 14 is provided with a pair of laterally spaced apart conventional "X" axis ways 385 which are integrally formed on the upper front and rear side edges of the base 14. The base 14 has a suitable coolant reservoir formed therein which is operatively connected to a coolant pump 386 for supplying coolant to the workcenter. The numeral 380, in FIG. 23, designates the coolant reservoir cover. As shown in FIGS. 7 and 25, the lubricant pump or supply unit 84 supplies lubricant through a nylon tubing 83 to the fitting 388, and thence through a nylon tubing 387 to a nylon tubing 401 on the saddle slide assembly 15. As shown in FIG. 9, the lube oil is fed from the fitting 388 through a nylon tubing 389 to the aforedescribed lube oil fitting 82 which supplies lube oil to the tool spindle slide assembly 12.

Saddle Slide Assembly

As shown in FIGS. 23, 24 and 25, the saddle slide assembly 15 is slidably mounted on the ways 385 on the base 14, and it is moved along the ways 385 by a conventional lead screw or ball screw assembly 391. The lead screw 391 is operatively mounted through a lead screw nut 392 which is fixedly mounted on the left side of the saddle slide assembly 15, as viewed in FIG. 24. As shown in FIG. 23, the outer end of the lead screw 391 is operatively connected to the output shaft of a direct current servo motor, generally indicated by the numeral 393. The motor 393 is the same type of motor as is employed for the "Y" axis drive motor 229 and the tool spindle drive motor 135. The "X" axis drive motor 393 is carried on a suitable mounting bracket 394 which is supported on the left side of the base 14. As shown in FIG. 23, the saddle slide assembly 15 is provided with a limit switch 395 which is adapted to engage the longitudinally spaced apart trip dogs 396 and 397 for limiting the longitudinal movement of the saddle slide assembly 15 on the "X" ways 385. In one embodiment, the trip dogs were spaced about 24 inches apart to limit the travel of the saddle slide assembly 15 to 24". As shown in FIG. 28, the saddle slide assembly 15 is provided with suitable way keepers 398 on the left side thereof for operative engagement with the ways 385 on the base 14. As shown in FIG. 29, the right side of the saddle slide assembly 15 is also provided with suitable way keepers 400 for operative engagement with the ways 385. The lube oil pump 84 supplies fluid through the tubing 401 which conveys lubricant to a distribution fitting 402 which is carried on the left side of the saddle slide assembly 15, as shown in FIGS. 27 and 28. The lube oil is conveyed from the fitting 402 by tubing 403 to the lead screw 391, and through other suitable tubings into the saddle slide assembly 15 for appropriate lubrication purposes. As shown in FIGS. 23 and 24, the saddle slide assembly 15 is provided with a pair of spaced apart "Z" axis ways 405 which are disposed transverse to the "X" axis ways 385.

Work Table Assembly

As shown in FIGS. 28 and 29, the work table assembly 16 is slidably mounted on the ways 405 on the saddle slide assembly 15, and it is moved along the ways 405 by a conventional lead screw or ball screw assembly 407. The lead screw 407 is operatively mounted through a lead screw nut 408 which is fixedly mounted in the front end of the work table assembly 16, as viewed in FIG. 28. As shown in FIG. 28, the outer end of the lead screw 407 is operatively connected to the output shaft of a direct current servo motor, generally indicated by the numeral 411. The motor 411 is the same type of motor as is employed for the "Y" axis drive motor 229, the "X" axis drive motor 393 and the tool spindle drive motor 135. The "Z" axis drive motor 411 is carried on a suitable mounting bracket 412 which is supported on the front side of the saddle slide assembly 15. As shown in FIGS. 26, 27 and 28, a limit switch 413 is fixed on the top of the saddle slide assembly 15, and it is adapted to be engaged by trip screws for limiting the transverse movement of the work table assembly 16 on the "Z" axis ways 405.

Figure 35:
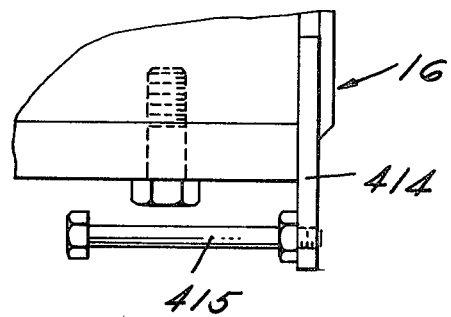
FIG. 35 is a fragmentary, elevation view of the work table assembly illustrated in FIG. 33, taken along the line 35—35 thereof, and looking in the direction of the arrows.
Figure 36:
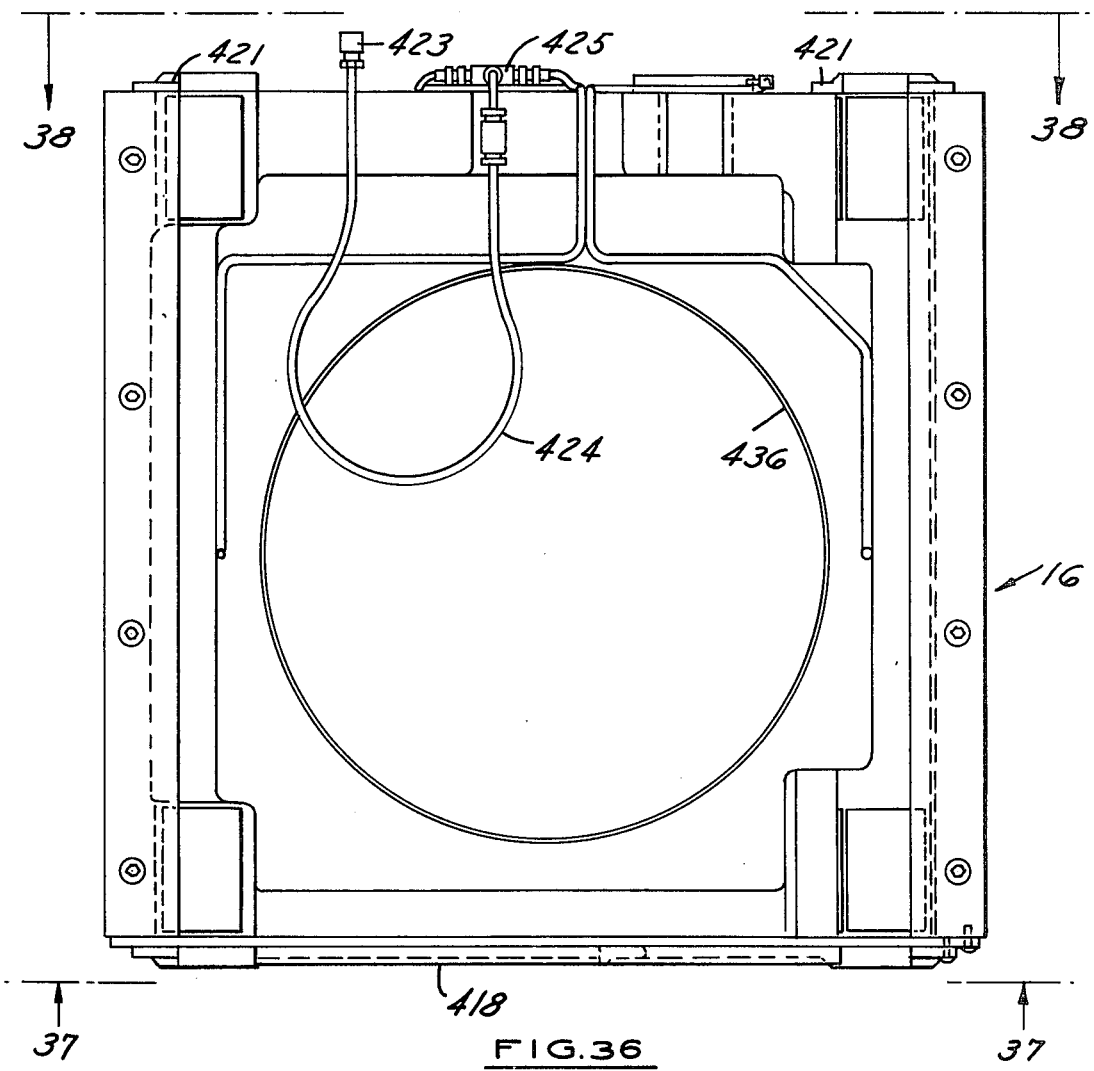
FIG. 36 is a bottom view of the work table assembly illustrated in FIG. 33, taken along the line 36—36 thereof, with the saddle slide assembly removed, and looking in the direction of the arrows.
Figure 37:
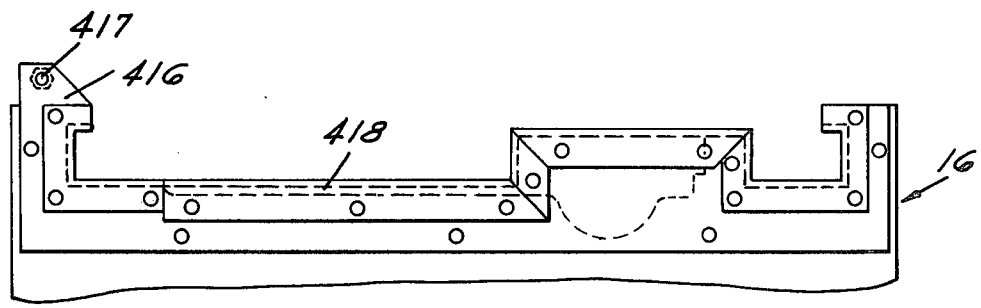
FIG. 37 is a rear end elevation view of the work table assembly illustrated in FIG. 36, taken along the line 37—37 thereof, and looking in the direction of the arrows.
Figure 38:
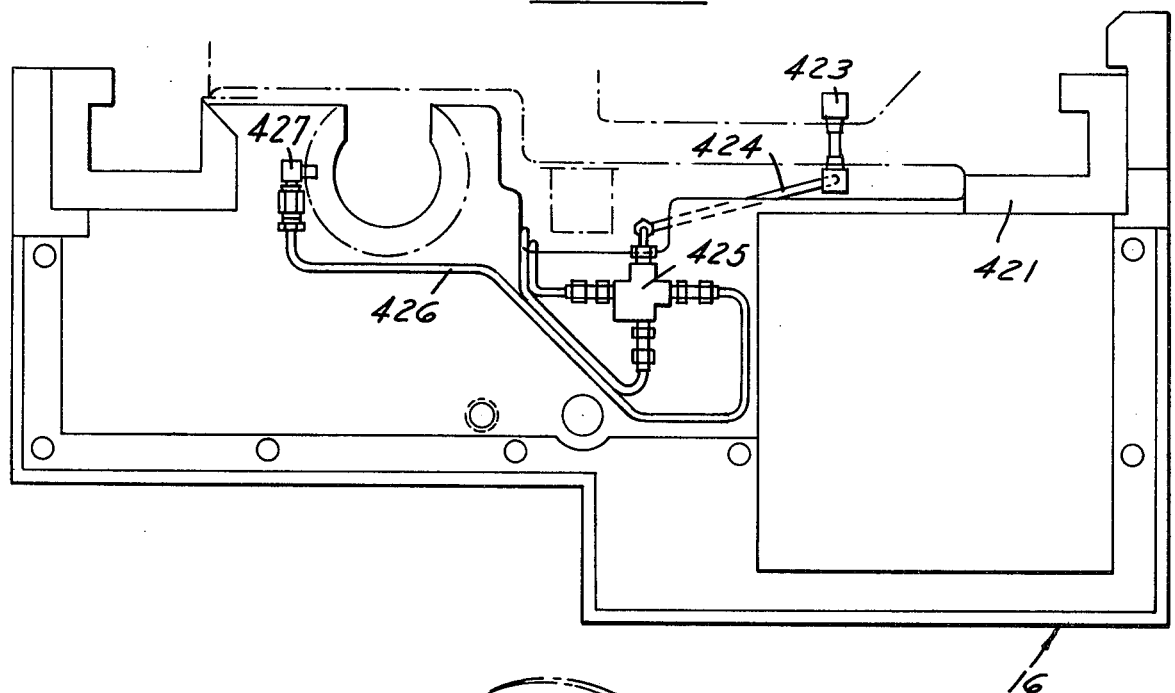
FIG. 38 is a front end elevation view of the work table assembly illustrated in FIG. 36, taken along the line 38—38 thereof, and looking in the direction of the arrows.

As shown in FIGS. 33 and 35, a trip bracket 414 is fixedly secured on the left side of the work table assembly 16, and it depends downwardly along the side thereof. The trip bracket 414 carries a trip screw 415 which is adjustably mounted, and which is adapted to engage the limit switch 413 when the work table assembly 16 is moved inwardly. FIG. 36 is an inverted rear end view of the work table assembly 16, and it shows a second depending trip bracket 416 which is carried adjacent the left rear end of the work table assembly 16, and which is provided with a second trip screw 417 for engagement with the limit switch 413 when the work table assembly 16 is moved outwardly. As shown in FIG. 37, the work table assembly 16 is provided along the rear face thereof with a way wiper 418. As shown in FIG. 38, the front end of the work table assembly 16 is also provided with a way wiper 421 across the front end thereof.

In one embodiment, the normal working travel of the work table assembly 16 on the saddle slide assembly 15 along the "Z" axis is about 16", with an additional inch of outward travel being provided if the machining center is provided with the optional pallet changer, as is explained more fully hereinafter. As shown in FIGS. 27 and 28, a tubing 422 feeds lubricant from the lubricant fitting 402 through the saddle slide assembly 15 to a junction fitting 423. As shown in FIG. 36, the fitting 423 is connected by a nylon flexible tubing 424 to a fitting 425 carried on the front of the work table assembly 16. Lube oil is fed from the fitting 425 through a tubing 426 and a fitting 427 to the work table assembly lead screw 407.

Work Table

FIGS. 30 through 34 illustrate a work table assembly 16 which is provided with a rotatable work table 17 (FIGS. 33, 34) which is not provided with the optional pallet changer apparatus. As shown in FIGS. 30 and 33, the work table 17 is provided with a cylindrical table spindle 428 which is secured to the bottom side thereof by suitable machine screws 429 and suitable fixture keys 430. The table spindle 428 is seated within a circular opening 433 which extends down into the top of the work table assembly 16. A suitable thrust roller bearing means 434 rotatably supports the table spindle 428 in the circular opening 433. The table spindle 428 is provided on the lower inner end thereof with an integral circular flange 435 which is mounted in an enlarged circular chamber 436 that is formed in the bottom of the work table assembly 16 and which communicates with the upper circular opening 433.

As shown in FIG. 33, a gear 437 is carried on the upper face of the flange 435 and it is fixedly secured thereto by suitable machine screws 438. The gear 437 meshes with and is driven by a worm gear 441 which is carried on a drive shaft 442 that is mounted in an elongated bore 440 formed in the work table assembly 16. As shown in FIG. 32, a worm gear 441 is fixed to the drive shaft 442 by a suitable key 443 and a lock nut 445 which holds the worm gear 441 against the outer end of the large diameter shaft portion 444 of the drive shaft 442. The enlarged portion 444 of the drive shaft 442 is rotatably mounted in a pair of suitable ball bearing means 446 which are supported in the inner end of a bearing mounting sleeve 448. A spacer sleeve 447 is mounted between the outer bearing means 446 and the adjacent end of the worm gear 441. The bearing mounting sleeve 448 is fixedly mounted in an enlarged outer end portion 451 of the bore 440. The outer end of the drive shaft 442 is rotatably supported by a pair of ball bearing means 452 which are seated in a peripheral recess formed in the inner periphery of the mounting sleeve 448 and held in place by an enlarged diameter portion 453 of the drive shaft 442. As shown in FIG. 32, the bearing mounting sleeve 448 is provided on its outer end with a mounting flange 454 which is seated on an inwardly directed flange of a motor mounting bracket 455. The mounting sleeve flange 454 is secured to the flange on the motor mounting bracket 455 by suitable machine screws 456. As shown in FIG. 30, the motor mounting bracket 455 is fixed to the work table assembly 16 by suitable machine screws 457.

A direct current servo drive motor, generally indicated by the numeral 458, is provided for driving the rotary work table 17. As shown in FIG. 32, the drive motor 458 is provided with a mounting flange 459 which is secured by machine screws 460 and washers 462 to the mounting bracket 455. The machine screws 460 pass through arcuate slots 461 which permit the motor 458 to be rotatably adjusted, for adjusting the proper backlash between the worm gear 441 and the gear 437. The drive motor 458 is provided with an output shaft 463 which receives the outer end 464 of the drive shaft 442. The motor output shaft 463 is connected to the drive shaft end 464 by a suitable set screw 465 (FIG. 32) and a key 466 (FIG. 31).

The rotary work table drive motor 458 rotates the work table 17 in a 360° rotary movement. As shown in FIG. 34, a limit switch 467 is mounted in the upper side of the work table 16, and it is adapted to be engaged by a trip dog 468 on the work table 17 for indicating that the table has been rotated 360°, and for control purposes, as desired. The drive motor 458 is of the same type direct current drive motor as employed for driving the tool spindle 47 and for the "X", "Y" and "Z" axes drive motors.

Optional Pallet Changer

The optional pallet changer is generally indicated by the numeral 22 in FIG. 1, and it is disposed at the right side of the "X" axis base 14. When the optional pallet changer 22 is employed, the work table assembly 16 previously described is modified so as to permit the use of a pair of interchangeable pallets, as indicated by the numerals 18 and 19 in FIG. 1. While the pallet 18 is holding a workpiece for cutting operations thereon by a tool 108, the other pallet 19 may be processed by removing a finished workpiece therefrom and replacing it with a new workpiece. The pallet 19 then subsequently replaces the pallet 18 in the metal cutting position relative to the tool spindle slide assembly 12.

Figure 39:
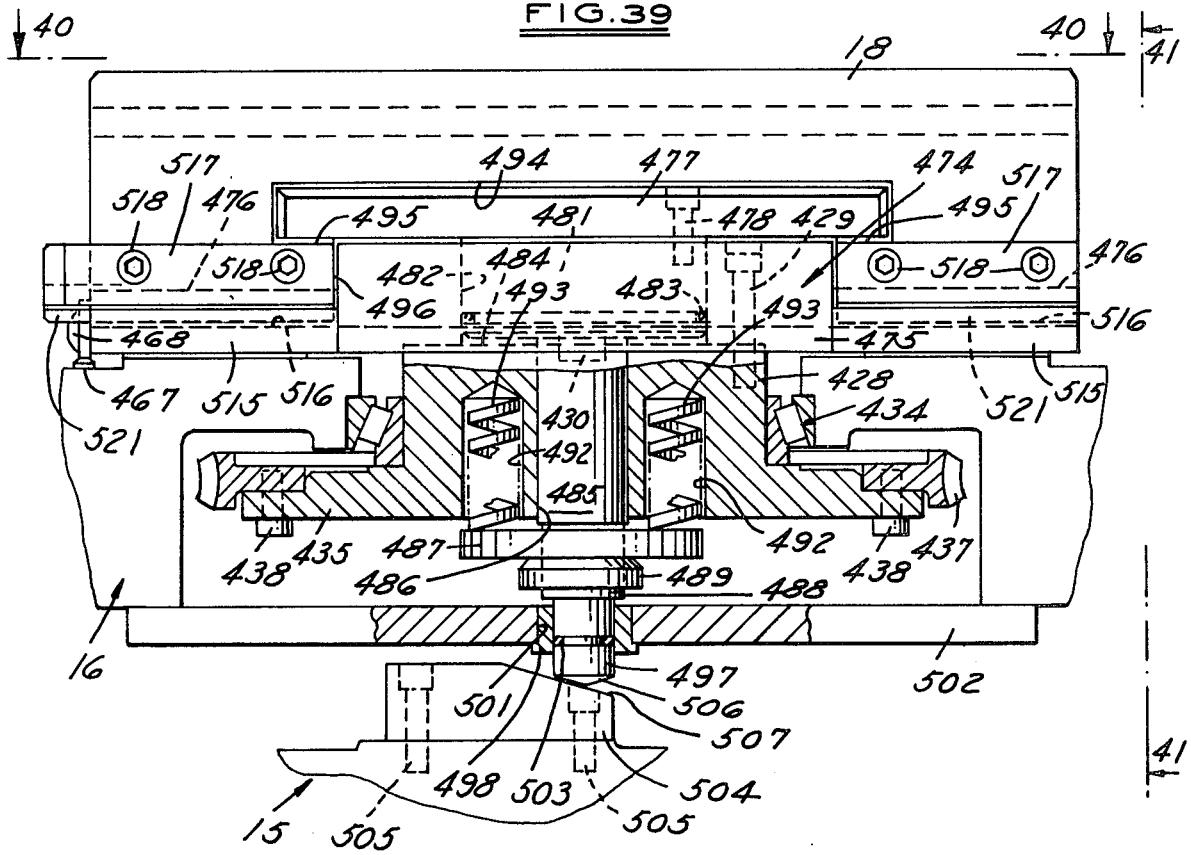
FIG. 39 is a fragmentary, enlarged, elevation view of the machining center structure illustrated in FIG. 3, taken substantially along the line 39—39 thereof, and looking in the direction of the arrows, and illustrating a work table provided with an optional pallet changer assembly structure.

As shown in FIG. 39, the work table assembly 16 is modified when the pallet changer 22 is employed, however the modified work table assembly 16 is still provided with the same rotary drive structure as described hereinbefore in relation to the work table shown in FIGS. 30 through 34, and the same reference numerals have been applied to said rotary drive structure in FIGS. 39, 40 and 41. It will be seen from the structure shown in FIG. 39, that when the pallet changer 22 is used, the work table 17 is replaced by an inverted T-shaped base member, generally indicated by the numeral 474. The base member 474 is provided with a central raised rectangular portion 475 which is secured like the work table 17, in the first described table embodiment, by suitable machine screws 429 to the previously described table spindle 428. The base member 474 is provided with a pair of integral side base plates 476 which extend sidewardly outward from the central raised portion 475, as shown in FIG. 39. A rectangular clamp plate 477 is secured by suitable machine screws 478 to the top end of a cylindrical shaft 481. As shown in FIGS. 39 and 41, the shaft 481 is slidably mounted for vertical movement in a cylindrical bore 482 formed in the central raised portion 475 of the base member 474. A suitable O-ring seal 483 is operatively mounted around the lower inner end of the shaft 481. As shown in FIG. 39, the lower end of the bore 482 is indicated by the numeral 484.

As shown in FIGS. 39 and 40, a vertical shaft 485, which is formed to a diameter smaller than the diameter of the shaft 481, is integrally formed on the lower end of the shaft 481, and it extends downwardly through a bore 486 which is formed through the spindle 428. As shown in FIG. 39, a flange 487 is mounted on a reduced diameter, threaded lower end 488 of the shaft 485, and it is secured in place by a suitable lock nut 489. A plurality of axial spring bores 492 are formed in the spindle 428, in the lower end thereof, and they extend upwardly around the shaft bore 486. A compression spring 493 is operatively mounted in each of the spring bores 492, and the lower ends thereof bear against the flange 487 for normally biasing the shaft 485 in the clamp plate 477 downwardly to bring the clamp plate 477 into a clamping engagement with a pallet 18 carried on the base member 474.

As shown in FIG. 39, each of the pallets, as the pallet 18, is provided on its lower side with a longitudinal, T-shaped slot formed therethrough which comprises an upper transverse portion 494 and a lower vertical portion 496. The base member 474 is received in the lower vertical portion 496 of the longitudinal T-shaped slot, and the clamp plate 477 is received in the transverse or horizontal portion 494. When the springs 493 move the clamp plate 477 downwardly, it will be seen that the outer end portions of the clamp plate 477 extend sidewardly beyond the central raised portion 475 of the base member 474, and move into a clamping engagement with the shoulders 495 formed by the lower side of the transverse slot portions 494, so as to force the pallet 18 downwardly into a clamping engagement on the side base plates 476.

The clamp plate 477 is released or unlocked from a pallet 18 during the last inch of travel of the work table assembly 16 outwardly. That is, if the work table 16 moves outwardly for 16" of travel on the "Z" axis, then it is continued on for another inch, during which the pallet 18 is unlocked. As shown in FIG. 38, the lower end 497 of the shaft 485 is reduced in diameter, and it is slidably mounted through a sleeve bushing 498 which is operatively mounted in a vertical bore 501 formed through a supporting plate 502 which is fixedly carried on the lower end of the work table assembly 16. A suitable O-ring seal 503 is mounted on the shaft portion 497. The lower end 497 of the shaft 485 is provided with a conical end cam surface 506 which acts as a cam follower for engagement with a tapered cam surface 507 that is formed on the inner end of an unlocking cam wedge 504. The unlocking cam wedge 504 is secured by suitable machine screws 505 to the upper side of the saddle slide assembly 15. It will be seen that as the work table assembly 16 is moved outwardly, or to the left as viewed in FIG. 39, during the last one inch of travel, that the shaft 485 will be cammed upwardly to move the clamping plate 477 upwardly from the clamping shoulders 495 on the pallet 18 to release the pallet and prepare it for a transfer operation, as described hereinafter.

Figure 42:
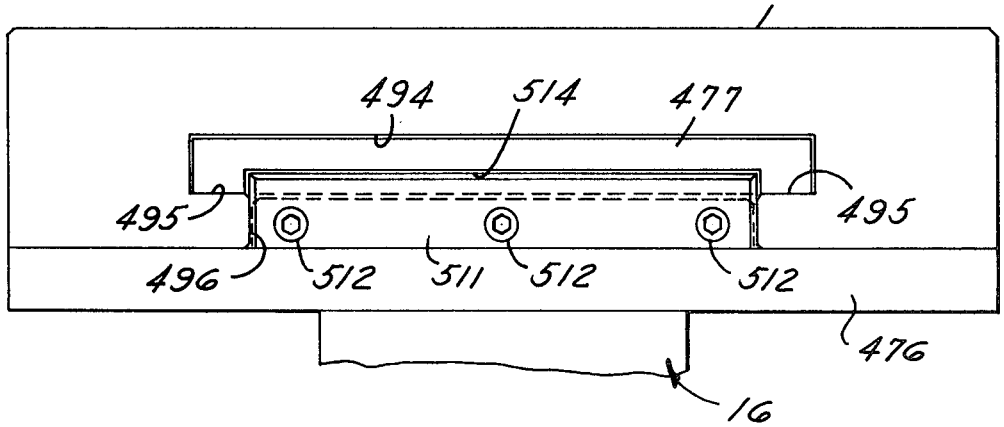
FIG. 42 is a right side elevation view of the structure illustrated in FIG. 41, taken along the line 42—42 thereof, and looking in the direction of the arrows.

As shown in FIGS. 41 and 42, a locating plate 511 is secured by machine screws 512 on the rear end 513 of the raised central portion 475 of the base member 474. As best seen in FIGS. 41 and 42, the locating plate 511 extends upwardly above the raised central portion 475 of the base member 474, and extends into a recess 514 formed in the lower face of the clamp plate 477. It will be seen from FIG. 42, that the outer sides of the locating plate 511 engage the vertical side edges 496 of the vertical portion of the T-shaped slot formed in the pallet 18 for locating the pallet axially. It also functions to prevent the clamp plate 477 from rotating.

As shown in FIGS. 39 and 40, each of the base plates 475 is provided on what may be termed the front end thereof with a transverse integral locating plate 515. As best seen in FIG. 41, each of the locating plates 515 is provided with a longitudinal groove 516 on the upper side thereof. A mating locating plate 517 is mounted on the front side of the pallet 18 above each of the locating plates 515 and secured to the outer lower face of the pallet by a pair of suitable machine screws 518. As shown in FIG. 41, each of the locating plates 517 is provided with a downwardly extended locating tongue 521 which is adapted to be seated in the adjacent groove 516 when the pallet is in a clamped position, as shown in FIGS. 39 and 41. The pallet 18 is not in a fully clamped position, as shown in FIGS. 39 and 41, and the lower shaft end 497 of the shaft 485 is partially into its upward movement along the unlocking cam surface 507 for raising the pallet 18 upwardly. It will be seen in FIG. 41, that the locating tongue 521 is partially raised upwardly out of the groove 516. When the clamping plate 477 is moved upwardly to its completely unlocked position, the locating tongues 521 are raised clear. The clamping plate 477 lifts the pallet 18 upwardly from the locating plates 515, so as to move the locating tongues 521 upwardly and out of the grooves 516 so that the lower ends of the locating tongues 521 are clear and above each of the locating plates 515 to permit the pallet 18 to be slid off of the base member 474. It will be seen that the clamping plates 515 and 517 cooperate to give the pallet 18 a proper radial location on the base member 474.

Figure 43:
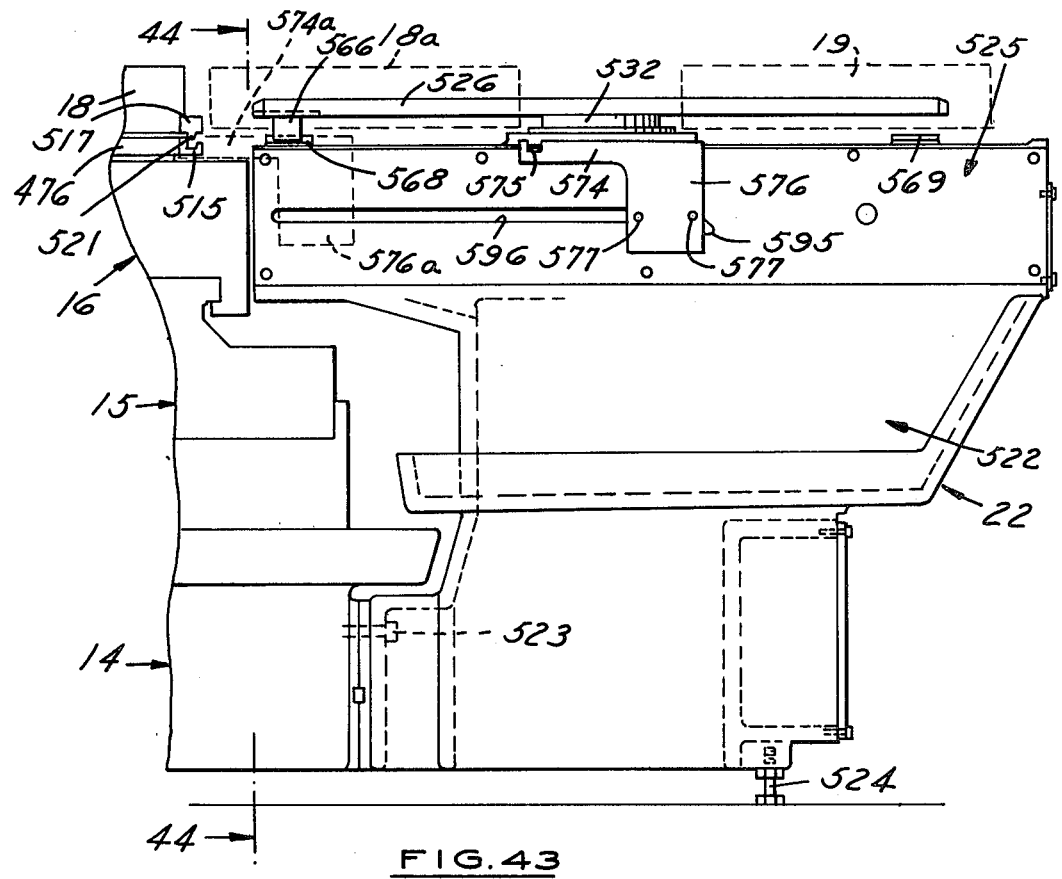
FIG. 43 is a front elevation view of the pallet changer assembly structure illustrated in FIG. 3, taken along the line 43—43 thereof, and looking in the direction of the arrows.
Figure 44:
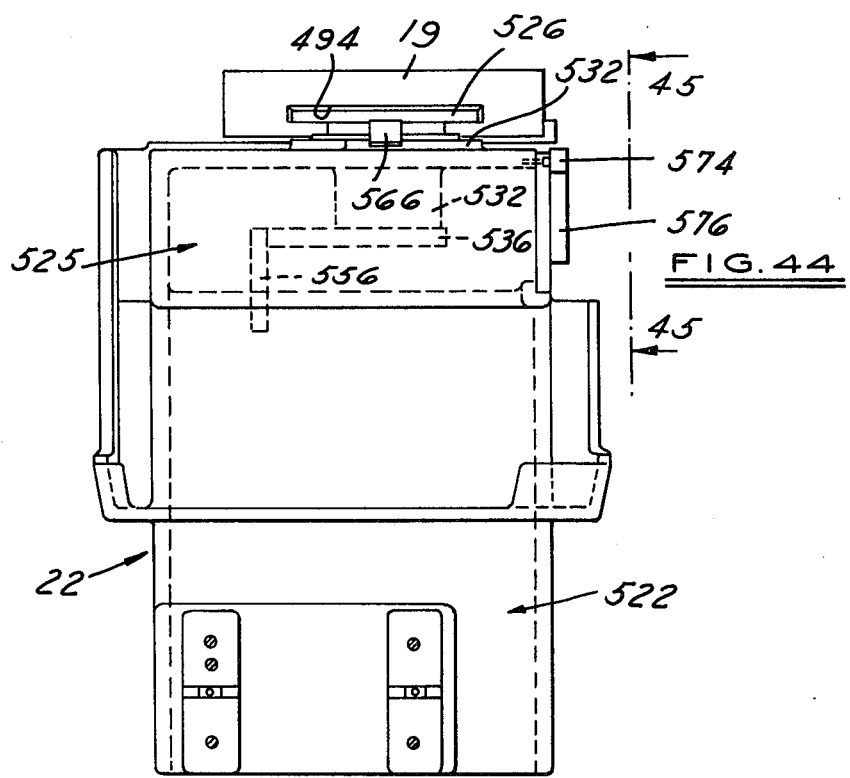
FIG. 44 is a left side elevation view of the pallet changer assembly structure illustrated in FIG. 43, taken along the line 44—44 thereof, and looking in the direction of the arrows.

As shown in FIGS. 43 and 44, the optional pallet changer 22 includes a base, generally indicated by the numeral 522, which is secured at the front end thereof to the right side of the "X" axis base 14 by suitable machine screws 523. The pallet changer base 522 is provided with suitable leveling screws 524. FIG. 1 shows a pallet changer base 522 which is slightly different in form than the base 522 shown in FIGS. 43 and 44, but the difference in the base form does not affect the function of the pallet changer. Also, the leveling screws 524 for the particular base 522 shown in FIG. 1 are of slightly different configuration and structure.

Figure 47:
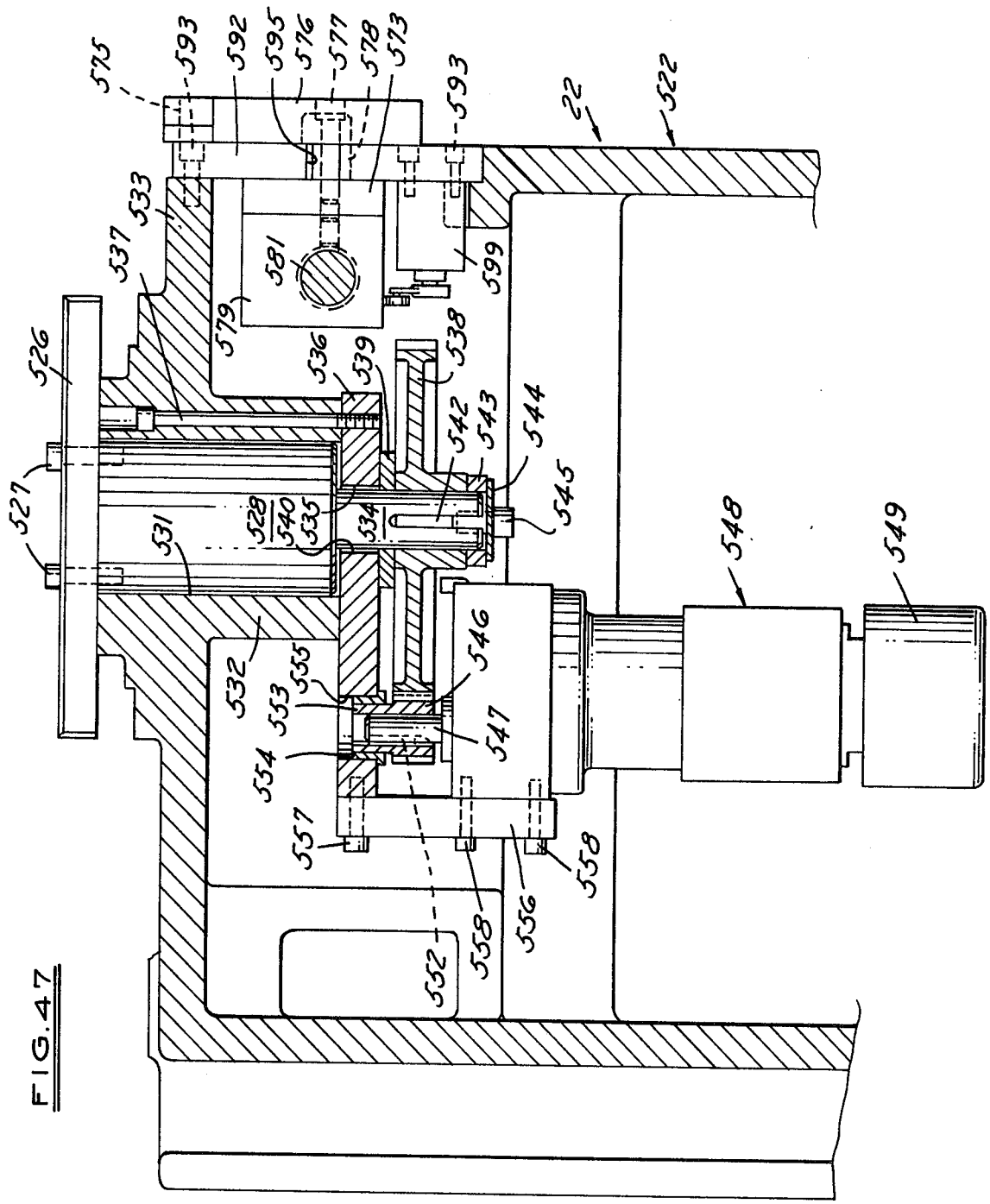
FIG. 47 is a fragmentary, enlarged, elevation section view of the structure illustrated in FIG. 45, taken along the line 47—47 thereof, and looking in the direction of the arrows.

As shown in FIGS. 43 and 44, a substantially rectangular pallet changer housing, generally indicated by the numeral 525, is operatively mounted on the top of the base 522 and it operatively supports an elongated pallet supporting guide plate 526. As shown in FIG. 47, the pallet supporting guide plate 526 is secured by suitable machine screws 527 to the upper end of a vertically disposed spindle or shaft 528. The guide plate supporting spindle 528 is rotatably mounted in a vertical bore 531 which is formed in a spindle journal 532. The spindle journal 532 is integrally formed with the pallet changer housing top wall 533.

As shown in FIG. 47, a reduced diameter drive shaft 534 is integrally attached to the lower end of the spindle 528, and it is rotatably mounted in a suitable sleeve bearing 540 that is mounted in a bore 535 formed vertically through a mounting plate 536. The mounting plate 536 is secured by suitable machine screws 537 to the lower end of the spindle journal 532. A drive gear 538 is fixedly secured to the lower end of the drive shaft 534 by a suitable key 542. A thrust washer 539 is mounted between the lower face of the mounting plate 536 and the drive gear 538. As shown in FIGS. 46 and 47, a switch operating arm 543 is mounted on the lower end of the drive shaft 534, and it is secured thereto by a retainer plate 544 and a machine screw 545.

As shown in FIG. 47, the drive gear 538 is meshed with and driven by a pinion gear 546 which is fixed to the output shaft 547 of a direct current servo gear motor, generally indicated by the numeral 548, by a suitable key 552. The drive motor 548 is provided with a disc brake 549, and it is of the general type described hereinbefore for the carousel drive system employed in the workcenter. The pinion gear 546 has an axially extended tubular gear shaft 533 which extends upwardly and which is rotatably mounted in a suitable sleeve bearing 554 that is operatively seated in a vertical bore 555 formed through the mounting plate 536. A motor support bracket 556 is secured to the one end of the mounting plate 536 by suitable machine screws 557. The drive motor 548 is secured to the bracket 556 by suitable machine screws 558.

As shown in FIG. 46, the switch operating arm or lever 543 is adapted to operate the limit switches 561 and 562 at the opposite ends of the oscillating rotatable travel of the guide plate 526. The limit switches 561 and 562 are fixedly secured by any suitable means on the support plate 536. The drive motor 548 is adapted to rotate the guide plate 526 through a 180° turn and then reverse the guide plate to its initial position. The limit switches 561 and 562 thus function to control the oscillating rotating movement of the guide plate 526.

As shown in FIG. 45, the guide plate 526 is provided with a pair of spring biased detent plungers 563 and 564 which are adapted to be engaged with a suitable detent hole 565 that is formed on the upper end of the journal member 532 for releasably retaining the pallets to the guide 526 during an index cycle. As shown in FIGS. 45 and 46, a downwardly extended stop arm 566, which is square in cross section, is fixed on the underside of the guide plate 526, by any suitable means. The stop arm 566 is provided with a suitable O-ring 567 around the outer surface thereof to act as a bumper. In the position shown in FIG. 45, the stop member 566 is disposed against a stop member 568 that is fixed on the upper surface of the housing wall 533. A second stop member 569, which is identical to the stop member 568, is disposed on the housing top wall 533 in an opposite position at the other end of the housing 525 when the guide plate 526 is rotated 180° counterclockwise, as viewed in FIG. 46, from the position shown therein through a 180° turn.

As best seen in FIGS. 43 and 45, the pallet changer 22 is provided with a pallet transfer arm 574 that is integrally formed on the forward end of a vertically disposed carrier plate member 576 which is slidably mounted along the outer side of the housing side wall 592. The pallet transfer arm 574 is provided with a transverse notch 575 which is shaped like, and adapted to receive, the locating tongue 521 formed on the lower side of an outward extension of one of the locating plates 517 carried on each of the pallets to be transferred by the pallet changer 22. As shown in FIGS. 46 and 47, the carrier plate 576 is secured by suitable machine screws 577 to a guide bracket 573 and an attachment bracket 579. The attachment bracket 579 is fixedly secured to a ball screw nut 580. A sliding key member 578 is interposed between the outer face of the guide bracket 573 and the inner face of the carrier plate 576, and it is adapted to be slidably mounted in a longitudinally extended, elongated slot 596 formed through the housing side wall 592. As shown in FIG. 46, the rear end of the slot 596 communicates with an enlarged slot 595, whereby when the carrier plate 576 is in the retracted position shown in FIGS. 43 and 45, the cam key 578 will move downwardly by cam action into the enlarged opening slot 595 to lower the transfer arm 574 to the inoperative position shown in FIG. 45 where it is separated from the locating tongue 521a of a pallet 18a which has been transferred onto the pallet guide plate 526. As shown in FIG. 47, the housing wall 592 is releasably secured to the rest of the housing structure by suitable machine screws 593.

As shown in FIG. 46, the ball screw nut 580 has rotatably mounted therethrough an elongated ball screw 581 which has the rear end thereof supported in a ball screw support indicated by the numeral 582. The rear end of the ball screw 581 is rotatably mounted in a pair of suitable bearing means 583 which are carried in the support 582. The rear end of the ball screw 581 is drivably connected by a suitable flexible coupling 586 to the output shaft 587 of an alternating current electric gear motor, generally indicated by the numeral 588. The motor 588 is provided with a disc brake 589. The motor 588 is secured by suitable machine screws 594 to a motor mounting bracket 590. The motor bracket 590 is secured by suitable bolt and nut means 591. As shown in FIG. 45, the pallet changer 22 is provided with a pair of longitudinally spaced apart limit switches 599 and 600 which are adapted to be engaged and operated by the bracket 579 when the ball screw nut 580 reaches its retracted position shown in FIGS. 45 and 46, and when it reaches its advanced position shown by the broken line position 576a in FIG. 43.

It will be seen that the pallet changer 22 illustrated in FIG. 1 has a somewhat different transfer arm. The numeral 601 indicates a guide rod which is operatively connected to a carrier member 602. The carrier member 602 is operatively connected to the aforedescribed ball screw nut 580 for moving the carrier member 602 longitudinally of the housing 525. The guide rod 601 slides in the slot 596 and then in the downwardly extended slot 595 at the rear end of the slot 596 for moving the carrier member 602 downwardly to detach the same from the locating tongue 521 on a pallet. A transfer arm 603 is carried by the carrier member 602 and it is provided with the notch 604 for the reception of a locating tongue 521 on a pallet.

A pair of pallets, as indicated by the numerals 18 and 19 in FIG. 1, are employed when the machining center of the present invention is provided with the optional pallet changer 22. For example, the first pallet 18 would have a workpiece mounted thereon for machining by a tool 108, while the operator is simultaneously removing a finished workpiece from the second pallet 19 and then mounting a new workpiece thereon in preparation for transferring the pallet 19 onto the work table assembly 16. After the workpiece on the pallet 18 has been machined, the work table assembly 16 is moved outwardly, or to the left as viewed in FIGS. 4 and 39, on the "Z" axis, and during the last one inch of outward travel, the cam surface 506 (FIG. 39) on the lower end of the shaft 497 engages the upwardly sloping cam surface 507 on the unlocking wedge or cam 504, and the clamp plate 477 is moved upwardly away from the clamping shoulders 495. Continued upward movement of the clamping plate 477 lifts the pallet 18 upwardly so that the locating tongues 521 on the locating plates 517 are moved upwardly above the locating plates 515.

It will be understood that the transfer arm 574 is positioned in the advanced position, shown in FIG. 43 by the numeral 574a, before the work table assembly 16 is moved into operative engagement with the unlocking cam 504. It will be seen that the locating plate 517 on the left side of the pallet 18, as viewed in FIGS. 39 and 41, has an extension portion thereon which extends sidewardly out beyond the pallet 18, and which during the last one inch outward travel of the work table assembly 16 will be moved into the groove 575 in the transfer arm 574. When the outward movement of the work table assembly 16 has been completed, and the pallet 18 unlocked and raised upwardly from the base member 474, the drive motor 588 for the ball screw 581 is then energized, and the ball screw nut 580 will be moved from the advanced position indicated by the numeral 580a in FIG. 46, back to the retracted position shown in FIG. 46 by the numeral 580. The transfer arm 574, having previously been engaged with the locating tongue 521 on the pallet 18, will pull the pallet 18 off of the base member 474 onto the supporting guide plate 526 and into the position indicated in FIG. 45 by the numeral 18a.

The drive motor 548 is next energized and the guide plate 526 is rotated in a counterclockwise direction, as viewed in FIG. 46, to move the pallet 19 into the forward position of the pallet 18a, and the pallet 18a into the rearward position of the pallet 19.

It will be seen that when the transfer arm 574 is moved to the retracted, solid line position shown in FIG. 45, it is moved downwardly due to the action of the key 578 moving downwardly into the enlarged slot 595, so as to be clear of the locating lip 521a. The downward movement of the key 578 is possible because the ball screw nut 580 is rotatable about the ball screw 581, and its rotative position is controlled by the key 578 sliding in the slots 595 and 596. After the aforementioned shifting of the pallets 18 and 19, in order to bring the pallet 19 with the new workpiece into the forward position adjacent the front end of the pallet changer 22, the ball screw motor 588 is energized to drive the nut 580 and the transfer arm 574 to the left, as viewed in FIGS. 45 and 46. The key 578 then is moved upwardly and into the longitudinal slot 596, and during such action the transfer arm 574 is raised up in order to bring the slot 575 into engagement with the locating tongue extension 521 on the newly positioned pallet 19. Continued movement then slides the pallet 19 off of the guide plates 526 and onto the base member 474. The work table assembly 16 is then moved inwardly on the "Z" axis ways, or to the right, as viewed in FIG. 39, so as to move the cam surface 506 on the shaft 497 to the right along the sloping cam surface 507, and to move the clamp plate 477 downwardly to clamp the new pallet 19 in place on the base member 474. It will be seen that when the work table assembly 16 is moved to the right, as viewed in FIGS. 39 and 40, the extension of the left locating plate 517 on the pallet 19 will be moved to the right out of engagement with the groove 575 on the transfer arm 574 to release the pallet 19 from the transfer arm 574.

Operation

The machining center 10 made in accordance with the principles of the present invention may be controlled by any suitable computer numerical control system as for example, a "NUMERA-TROL" positioning control system available on the market from the Ex-Cell-O Corporation of Detroit, Michigan. The last mentioned positioning system is programmed incrementally, (4) axis, accepting tab sequential data. It will accommodate the positioning of all linear axes as well as 360 discrete positions of the rotary axis. It will accept and control all feed rates and rapid traverse rates. It will control all spindle speed selections and directions, coolant On-Off situations, the entire cycle and desired sequence of automatic tool changing, and other control factors.

The computer numerical control system is operatively mounted in the control panel 20, and it includes a conventional tape reader 608 that is shown in FIG. 1. As shown in FIG. 6, the tape reader 608 is enclosed in a housing which is disposed on the outside wall of the panel 20, and accordingly, it does not put any heat into the control panel 20. As shown in FIG. 6, the lower wall 610 of the housing in which the tape reader 608 is mounted is provided with an opening 609 to permit the flow of cooling air to pass up through the housing 608 and out through an opening 611 formed through the upper end of the front housing wall 612.

U.S. Pat. No. 3,753,237 illustrates an electronic circuit for random tool selection which may be employed for controlling the machining center 10 of the present invention. The rotary switch 18 shown in the circuit of said patent would be used to replace the function of the up-down counter provided by the two limit switches 347 and 349 shown in FIG. 22. The control circuit of U.S. Pat. No. 3,753,237 may be employed with the present invention by having the two limit switches 347 and 349 carry out the function of rotary switch 18 of said circuit. Another control circuit that may be employed with the present invention is the control circuit disclosed in copending United States patent application, Ser. No. 364,721, filed Aug. 14, 1973, and entitled "Electronic Structure For And Method of Random Tool Selection." Patent application, Ser. No. 364,721 is a continuation-in-part of the aforementioned U.S. Pat. No. 3,753,237.

Figure 49:
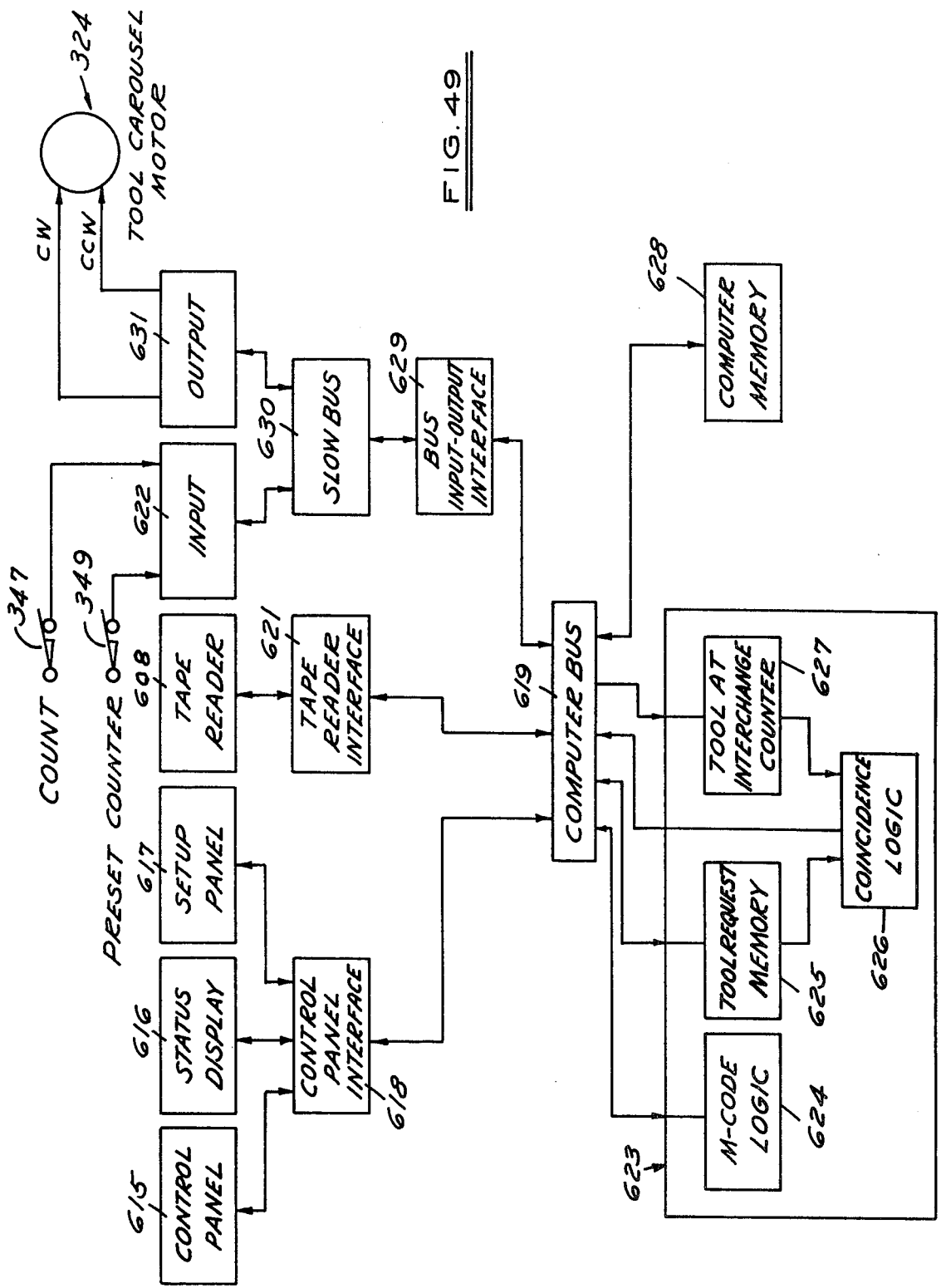
FIG. 49 is a block diagram of an illustrative electronic circuit for selection of tools from the carousel.

FIG. 49 is a block diagram of an illustrative electronic circuit for selection of tools from the carousel 13. The limit switch 347 has its operating arm 348 positioned so as to be operated by the slots 357 formed in the back face of the carousel 296 (FIG. 22). The tools 108 are always taken out of and put back into the same tool slot 358 (FIG. 21) on the carousel 13. Accordingly, the limit switches 347 and 349 can be set to an initial or zero reference point, as when tool slot #1 is in the tool exchange location indicated by the upper solid line position of the tool 104 in FIG. 48. The limit switch 347 is an input count limit switch, and the limit switch 349 is an input home or preset limit switch. The preset limit switch 349 is only operated by one of the slots 357 on the back face of the carousel wheel 296, that is, the slot 357 which would indicate that the tool slot #1 is at the tool interchange position. The slot 357 that operates the switch 349 is 90° out of position from the tool interchange position, and it is longer than the other slots 357. The other slots 357 are formed to a shorter length so as not to operate the preset switch 349. The limit switches 347 and 349 are positioned 90° counterclockwise from the tool interchange position (FIG. 22). The master control unit is programmed relative to the specific tool or each specific one of the twenty-four tool slot locations, and the tool carried therein.

The tool request data is entered via the tape reader 608 of a master data input keyboard. The tool request is then interfaced to the tool number memory 625 in the programmable interface control, generally indicated by the numeral 623 in FIG. 49, and the computer memory 628. The tool request is channeled through the tape reader interface 621 and the computer bus 619. The tool request is also interfaced to the coincidence logic 626. The input from the counter limit switch 347 and the present limit switch 349 is entered via the input circuit 622 and it is channeled through the slow bus 630, and the bus input-output interface 629 to the computer bus 619, and to the tool at interchange counter 627. The coincidence logic 626 compares the tool request number with the tool number at the interchange point which is calculated by the tool counter logic.

The tool counter logic is in two segments wherein one segment counts up and the other segment counts down. Whether the count is to be made up or down is determined by the direction of rotation of the carousel 13. The direction of rotation of the carousel 13 is determined by the presence or absence of the master code logic 624. If there is no coincidence when the coincidence logic 625 compares the tool request number with the tool at the interchange point, then the programmable interface control 623 outputs a signal to rotate the carousel 13. If there is coincidence with the coincidence logic 626 when compared with the tool request number, then the carousel motor 324 is stopped, since the carousel 13 is in the proper position with the desired tool at the tool interchange point. If there is no coincidence, the direction of rotation of the carousel 13 is determined by an input function termed M-20 which will cause a counterclockwise rotation of the carousel 13, and said input is entered from the control panel 615. As the carousel 13 is rotated, the counter limit switch 347 counts up or down in binary code. The counter tabulation goes into the tool logic of the tool counter 627. The tool counter 627 can also be referenced by a manual request for tool number 24 through the set up panel 617 which causes the carousel 13 to go in a clockwise direction, and the carousel to rotate through the home position, namely, the #1 tool slot position. When the carousel 13 goes through the home position, the home or preset limit switch 349 is operated and the counter 627 is preset at 1, and the limit switch 347 then starts counting and creates an electric pulse for each count which is added to the preset 1 count on the tool counter 627. The counter tabulation goes into the coincidence logic 626 and it is compared to the actual tool number that has previously been called up, and when coincidence is reached, the carousel motor 324 is stopped with the correct tool at the interchange point. The rotation control signals for the carousel motor 324 are channeled through the slow bus 630 and the output circuit 631 to the motor 324. The status display 616 include all of the lights on the front panel of the general control panel 20. The control panel structure 615 and the set up panel structure 617 is also carried on the general control panel 20. As each new tool number is entered, all the tool offsets for that tool are made active for use in cutter path calculations.

The operation of transferring a previously used tool from the tool spindle 47 to the carousel 13, and a new tool from the carousel 13 to the tool spindle 47, is carried out in the following manner. As shown in FIG. 48, a used tool in a tool chuck 104 would be raised upwardly from the broken line position 104a shown in FIG. 48 to the tool exchange location indicated by the solid line position 104 when the tool spindle slide assembly 12 is moved upwardly to move the tool spindle from the broken line position 47a to the solid line position 47. The spindle 47 is stopped at the tool exchange location in a predetermined angular position, by the aforedescribed unlock wedge 248 which also unlocks the tool chuck 104. The upward movement of the spindle 47 also inserts the tool chuck 104 back into the same pot 358 that it was stored in the same angular position as it was removed from the carousel 13. The carousel 13 then withdraws the tool chuck 104 by moving outwardly from the solid line position shown in FIG. 48 to an advanced position 13a. As described hereinbefore, the carousel 13 is then rotated in an appropriate direction by the control means to bring the next programmed tool pot 358 into the lowermost position or tool change position during the outward travel of the carousel 13. The carousel 13 is then retracted to the solid line position shown in FIG. 48, and during the last portion of such retraction movement, the next new tool chuck 104 which was brought to the tool change position is inserted axially into the spindle 47, with the drive key 101 received in the keyway 99 in the new tool chuck 104. The tool spindle slide assembly 12 is then moved downwardly and the unlock wedge 248 is moved in a counterclockwise direction to the broken line position shown in FIG. 14a by means of the spring 265, to lock the new tool chuck 104 in the spindle 47, and unlock the tool spindle 47 for rotation. The tool spindle 47 functions to withdraw the new tool from the tool carousel 13 as the spindle 47 moves downwardly to the broken line position shown in FIG. 48 by the numeral 47a, where it is then ready for a cutting operation with the new tool on a workpiece. The tool exchange location may also be termed a tool change position.

Twenty-four tools can be stored in the rotary, high-speed carousel 13 and adjacent tools can be changed in a total time of four seconds. It will be seen that all or a part of the total number of twenty-four tools capable of being carried by carousel 13 can be used in a desired sequence of cutting operations on a workpiece, and that the tools are automatically transferred between the spindle 47 and the carousel 13 in the aforedescribed manner.

The operation of the optional pallet changer has been described hereinbefore in detail, and it will be understood that the operation of the pallet changer may be controlled by any suitable electric control system and that the pallet change takes place automatically by itself, but that the operator must initiate the start of the cycle.

It will be seen that the machining center of the present invention eliminates the need for hydraulic control units which are noisy and dirty and require constant changing of oil. The electric drive motors employed in the machining center of the present invention are identical and interchangeable, and a suitable motor is available from the Getty's Manufacturing Company, Inc., of Racine, Wisconsin, and sold under model #30-2130-A or Model #10-3140-A, and this type motor is also shown in U.S. Pat. No. 3,558,942.

The use of the electric drive motors connected directly to the ball screws eliminates heat because of the fewer components required in the driving apparatus for the various moving parts of the machining center. The direct connection of the drive motors to the ball screws eliminates some of the friction and resultant heat normally involved in the prior art type linkage structure. The generating of less heat in operating the machining center provides for a resultant greater accuracy in machining operations. The direct current motors and ball screw assemblies employed also provide for fast traverse and reversal of the various slide members. The employment of the mechanical means, including the unlock wedge 248 for radially locating the spindle 47 and for releasing the tool chuck 104 carried in the spindle 47, provides for an all mechanical operation which is positive and efficient in operation. Accordingly, this is advantageous since there is no need to bother with any electrical or hydraulic adjustments.

The collet means employed in the invention, with the collet fingers 117 being of constant diameter throughout their length when the collet fingers 117 are in the inoperative position, provides a collet means which is cheaper and easier to manufacture, long lived, and fast in operation. Because of the structure of the collet arms 117, they have a smaller movement to go through, from the free state or inoperative position to the operative position, and accordingly, they are subject to less fatigue and provide longer collet life.

The construction of the chamfer teeth on the spline clutch gear or spline gear 182 provides for an efficient low friction gear drive means for the spindle 47. The novel structure employed in the collet unlocking apparatus is accomplished by the movement of the tool spindle slide assembly 12 on the "Y" axis without the need for any extra power means for operating such structure.

While it will be apparent that the preferred embodiments of the invention herein disclosed are well calculated to fulfill the objects above stated, it will be appreciated that the invention is susceptible to modification, variation and change.

What is claimed is:

1. In a machine tool having a column assembly on which is slidably mounted a tool spindle slide assembly on Y-axis ways, and wherein an X-axis ways base is mounted adjacent said column assembly, and a Z-axis ways saddle slide assembly is slidably mounted on the X-axis ways, and a work table assembly is slidably mounted on the Z-axis ways on the saddle slide assembly, the combination of:
(a) a pallet base member rotatably mounted on said work table assembly;
(b) a pallet slidably mounted on said pallet base member;
(c) a clamp plate movably mounted on said pallet base member for clamping the pallet on said base member;
(d) power drive means for rotating said pallet base member;
(e) said pallet being provided with means for sliding the pallet off said pallet base member; and
(f) means for moving said clamp plate between a clamped operative position, and an unclamped inoperative position wherein said means for moving said clamp plate includes:
  (1) spring means for moving said clamp plate downwardly to a clamped operative position; and
  (2) cam means for moving said clamp plate to said unclamped inoperative position.

2. In a machine tool the combination as defined in claim 1, wherein said cam means includes:
(a) an unlocking cam wedge mounted on the saddle slide assembly; and
(b) a cam follower shaft attached to the cam plate whereby when said work table assembly is moved in one direction on the Z-axis ways on the saddle slide assembly, said cam follower shaft is engaged by said unlocking cam wedge and the cam follower shaft is moved upwardly for moving the clamp plate to said unclamped inoperative position.

3. In a machine tool as defined in claim 2 wherein said means for sliding the pallet off the pallet base member includes:
(a) a locating plate mounted on the pallet and engageable with a locating member on the pallet base member for locating the pallet axially, and having an extension portion extended sidewardly out from the pallet.

4. In a machine tool, the combination as defined in claim 3, including:
(a) means for locating the pallet on a pallet base member radially.

5. In a machine tool as defined in claim 4, the combination including:
(a) a pallet changer means for sliding a first pallet off of said pallet base member and onto a supporting guide plate.

6. In a machine tool as defined in claim 5, wherein said pallet changer means includes:
(a) a base disposed adjacent the work table assembly;
(b) said supporting guide plate being rotatably mounted on said base;
(c) power drive means for rotating said guide plate; and,
(d) means for transferring a first pallet from said pallet base member onto said supporting guide plate.

7. In a machine tool as defined in claim 6, wherein the pallet transferring means includes:
(a) a transfer arm engageable with the extended portion of said locating plate on a pallet when it is disposed on the pallet base member;
(b) a ball screw assembly means having a drive nut means;
(c) power drive means for operating said ball screw assembly means; and,
(d) guide arm means interconnecting said drive nut means on the ball screw assembly means for moving the transfer arm between a position for engaging the locating plate on a pallet on the pallet base member for moving said pallet onto said supporting guide plate, and for moving a second pallet off said supporting guide plate onto said pallet base member.

* * * * *